United States Patent
Kobayashi et al.

(10) Patent No.: US 7,679,659 B2
(45) Date of Patent: Mar. 16, 2010

(54) IMAGING APPARATUS HAVING DARK CURRENT CORRECTING UNIT

(75) Inventors: Hirokazu Kobayashi, Asaka (JP); Tomoyuki Kawai, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 355 days.

(21) Appl. No.: 11/925,580

(22) Filed: Oct. 26, 2007

(65) Prior Publication Data
US 2008/0129847 A1   Jun. 5, 2008

(30) Foreign Application Priority Data
Oct. 30, 2006   (JP) ................. P2006-294022

(51) Int. Cl.
*H04N 9/64* (2006.01)
*H04N 5/217* (2006.01)
(52) U.S. Cl. .................. 348/243; 348/244
(58) Field of Classification Search .............. None
See application file for complete search history.

(56) References Cited

U.S. PATENT DOCUMENTS 7,256,378 B2 * 8/2007 Furukawa et al. ......... 250/208.1
7,385,637 B2 * 6/2008 Guillemaud ............... 348/243
7,554,594 B2 * 6/2009 Kobayashi ................. 348/311
2004/0051797 A1 * 3/2004 Kelly et al. ................ 348/244
2006/0092283 A1   5/2006 Tanizoe et al.
2009/0160979 A1 * 6/2009 Xu et al. .................... 348/243

FOREIGN PATENT DOCUMENTS

EP    0957628 A2 * 11/1999
JP    2004-7048 A    1/2004
JP    2006-94474 A   4/2006

* cited by examiner

*Primary Examiner*—Ngoc-Yen T Vu
(74) *Attorney, Agent, or Firm*—Birch, Stewart, Kolasch & Birch, LLP

(57) ABSTRACT

A digital camera includes a solid-state imaging device in which plural pixel columns, each including plural pixels arrayed in a column direction, are arrayed in a row direction. The pixels of each pixel column include upper OBs, lower OBs, and PDs disposed between the upper OBs and the lower OBs. The digital camera includes: a dark current correcting unit that performs dark current correction based on a linear function for correction in order to correct a dark current; an OB average calculating unit that calculates an average of upper OB signals acquired from the upper OBs by imaging and an average of lower OB signals acquired from the lower OBs by the imaging; and a correcting linear function generating unit that generates the linear function for correction based on the average of the upper OB signals, the average of the lower OB signals, and the number of PDs.

34 Claims, 9 Drawing Sheets

IMAGING APPARATUS HAVING DARK CURRENT CORRECTING UNIT

CROSS-REFERENCE TO RELATED APPLICATIONS

This application is based upon and claims the benefit of priority from the Japanese Patent Application No. 2006-294022 filed on Oct. 30, 2006, the entire contents of which are incorporated herein by reference.

BACKGROUND OF THE INVENTION

1. Technical Field

The invention relates to an imaging apparatus including a CCD type solid-state imaging device in which a plurality of photoelectric-conversion-element columns, each including a plurality of photoelectric conversion elements arrayed in a column direction on a semiconductor substrate, are arrayed in a row direction perpendicular to the column direction on the semiconductor substrate.

2. Description of the Related Art

An imaging apparatus mounted of a related art with a CCD type solid-state imaging device subtracts a dark current, which is generated when electric charges are transferred from a charge transfer section corresponding to each photoelectric-conversion-element column of the CCD type solid-state imaging device, from a signal obtained from each photoelectric-conversion-element column, thereby correcting the dark current.

JP 2004-7048 A and JP 2006-94474 A (corresponding to US 2006/0092283 A) disclose a method of acquiring an imaging signal output from a solid-state imaging device in a state where the solid-state imaging device is exposed and then acquiring dark current data by driving a charge transfer section in a state where the solid-state imaging device is not exposed.

In the method described above, the imaging signal is first acquired and then driving for acquiring the dark current data is performed. For this reason, power consumption increases and a time period taken until the dark current correction is increased.

SUMMARY OF THE INVENTION

The invention has been made in view of the above circumstances, and provides an imaging apparatus capable of shortening a time period taken until the dark current correction and decreasing power consumption.

[1] According to an aspect of the invention, an imaging apparatus includes a solid-state imaging device, a dark current correcting unit, an average calculating unit, and a linear function generating unit. In the solid-state imaging device, a plurality of pixel columns, each including a plurality of pixels arrayed in a column direction on a semiconductor substrate, are arrayed in a row direction perpendicular to the column direction on the semiconductor substrate. The solid-state imaging device includes charge transfer sections provided corresponding to the respective pixel columns. Each charge transfer section transfers electric charges, which are generated in the pixel column corresponding to each charge transfer section, in the column direction. The plurality of pixels of each pixel column include a plurality of first pixels for acquisition of dark current level, disposed at an end portion of the corresponding charge transfer section on an upstream side in a charge transfer direction; a plurality of second pixels for acquisition of dark current level, disposed at an end portion of the charger transfer section on a downstream side in the charge transfer direction; and a plurality of light receiving pixels disposed between the first pixels and the second pixels. The dark current correcting unit performs dark current correction based on a linear function for correction that expresses a level of a dark current using a position coordinate of each light receiving pixel as a variable. The dark current correction subtracts the dark current from a signal corresponding to an electric charge which is generated in each light receiving pixel by imaging. The dark current is a signal corresponding to a dark charge superimposed on the electric charge generated in each light receiving pixel when the electric charge is transferred through the corresponding charge transfer section. The average calculating unit calculates an average of first-pixel signals, which are acquired from the respective first pixels of each pixel column by the imaging. The average calculating unit calculates an average of second-pixel signals, which are acquired from the respective second pixels of each pixel column by the imaging. The linear function generating unit sets the average of the first-pixel signals of each pixel column to a level of a dark current superimposed on a signal corresponding to an electric charge, which is generated in a light receiving pixel adjacent to the first pixels of each pixel column by the imaging. The linear function generating unit sets the average of the second-pixels signals of each pixel column to a level of a dark current superimposed on a signal corresponding to an electric charge, which is generated in a light receiving pixel adjacent to the second pixels of each pixel column by the imaging. The linear function generating unit generates the linear function for correction using the average of the first-pixel signals of each pixel column, the average of the second-pixel signals of each pixel column, and number of the light receiving pixels of each pixel column.

[2] According to another aspect of the invention, an imaging apparatus includes a solid-state imaging device, a dark current correcting unit, a storage unit, a second average calculating unit and a second linear function generating unit. In the solid-state imaging device, a plurality of pixel columns, each including a plurality of pixels arrayed in a column direction on a semiconductor substrate, are arrayed in a row direction perpendicular to the column direction on the semiconductor substrate. The solid-state imaging device includes charge transfer sections provided corresponding to the respective pixel columns. Each charge transfer section transfers electric charges, which are generated in the pixel column corresponding to each charge transfer section, in the column direction. The plurality of pixels of each pixel column comprise a plurality of first pixels for acquisition of dark current level, disposed at an end portion of the corresponding charge transfer section on an upstream side in a charge transfer direction; a plurality of second pixels for acquisition of dark current level, disposed at an end portion of the charger transfer section on a downstream side in the charge transfer direction; and a plurality of light receiving pixels disposed between the first pixels and the second pixels. The dark current correcting unit performs dark current correction based on a second linear function that expresses a level of a dark current using a position coordinate of each light receiving pixel as a variable. The dark current correction subtracts the dark current from a signal corresponding to an electric charge which is generated in each light receiving pixel by imaging. The dark current is a signal corresponding to a dark charge superimposed on the electric charge generated in each light receiving pixel when the electric charge is transferred through the corresponding charge transfer section. Dark current acquisition drive for driving the solid-state imaging device is performed in advance of the imaging and separately from the imaging. The storage unit stores a first linear function in association with at least a first average of the first pixels, which is an average of signals corresponding to the respective first pixels among signals acquired by performing the dark current acquisition drive from the charge transfer section corresponding to each pixel column. Each first linear function expresses a level of a dark current superimposed on a signal corresponding to the light receiving pixel, using a position coordinate of the light receiving pixel as a variable. The second average calculating unit calculates at least a second average of the first pixels that is an average of signals acquired from the plurality of first pixels of each pixel column by the imaging. The second linear function generating unit generates a second linear function by multiplying respective terms of each first linear function stored in the storage unit by a ratio of the second average to the first average corresponding to each first linear function.

[3] In the imaging apparatus of [2], the storage unit may store the first linear function in association with a first average of the second pixels which is an average of signals corresponding to the respective second pixels among the signals acquired by performing the dark current acquisition drive from the charge transfer section corresponding to each pixel column. The average calculating unit may further calculate a second average of the second pixels that is an average of signals acquired from the plurality of second pixels of each pixel column by the imaging. The linear function generating unit may generate the second linear function by multiplying the respective terms of each first linear function stored in the storage unit by a ratio of a difference between the second average of the first pixels and the second average of the second pixels to a difference between the first average of the first pixels and the first average of the second pixels, which correspond to each first linear function.

[4] In the imaging apparatus of [2], each first linear function and each first average of the first pixels, which are stored in the storage unit, may be generated using an average of signals acquired from the corresponding charge transfer section by performing the dark current acquisition drive plural times.

[5] The imaging apparatus of [2], may further include a driving unit, a first linear function generating unit, a first average calculating unit and a storage control unit. The driving unit that performs the dark current acquisition drive in a mode for generating the first linear functions. The first linear function generating unit that generates each first linear function based on the signals, which are acquired from the corresponding charge transfer section by the dark current acquisition drive. The first average calculating unit calculates each first average of the first pixels which is the average of the signals corresponding to the respective first pixels among the signals acquired by performing the dark current acquisition drive from the corresponding charge transfer section. The storage control unit stores, in the storage unit, the first linear functions generated by the first linear function generating unit and the first averages of the first pixels calculated by the first average calculating unit in association with each other.

[6] The imaging apparatus of [4] may further include a driving unit, a signal average calculating unit, a first linear function generating unit, a first average calculating unit and a storage control unit. The driving unit performs the dark current acquisition drive plural times in a mode for generating the first linear functions. The signal average calculating unit calculates the average of the signals acquired from the corresponding charge transfer section of each pixel column by performing the dark current acquisition drive the plural times. The first linear function generating unit that generates each first linear function based on signals, which correspond to the light receiving pixels of the corresponding pixel column, among the signals subject to the calculating by the signal average calculating unit. The first average calculating unit calculates each first average of the first pixels that is the average of the signals, which correspond to the first pixels of the corresponding pixel column, among the signals subject to the calculating by the signal average calculating unit. The storage control unit stores, in the storage unit, the first linear functions generated by the first linear function generating unit and the first averages of the first pixels calculated by the first average calculating unit in association with each other.

[7] In the imaging apparatus of [3], each first linear function, each first average of the first pixels and each first average of the second pixels, which are stored in the storage unit, may be generated using an average of the signals acquired from the corresponding charge transfer section by performing the dark current acquisition drive plural times.

[8] The imaging apparatus of [3] may further include a driving unit, a first linear function generating unit, a first average calculating unit and a storage control unit. The driving unit performs the dark current acquisition drive in a mode for generating the first linear functions. The first linear function generating unit generates each first linear function based on the signals, which are acquired from the corresponding charge transfer section by the dark current acquisition drive. The first average calculating unit calculates each first average of the first pixels which is the average of the signals corresponding to the respective first pixels among the signals acquired by performing the dark current acquisition drive from the corresponding charge transfer section. The first average calculating unit calculates each first average of the second pixels which is an average of signals corresponding to the respective second pixels among the signals acquired by performing the dark current acquisition drive from the corresponding charge transfer section. The storage control unit stores, in the storage unit, the first linear functions generated by the first linear function generating unit and the first averages of the first pixels and the first averages of the second pixels, which are calculated by the first average calculating unit, in association with each other.

[9] The imaging apparatus of [7] may further include a driving unit, a signal average calculating unit, a first linear function generating unit, a first average calculating unit and a storage control unit. The driving unit performs the dark current acquisition drive plural times in a mode for generating the first linear functions. The signal average calculating unit calculates an average of the signals acquired from the corresponding charge transfer section of each pixel column by performing the dark current acquisition drive the plural times. The first linear function generating unit generates each first linear function based on signals, which correspond to the light receiving pixels of the corresponding pixel column, among the signals subject to the calculating by the signal average calculating unit. The first average calculating unit calculates each first average of the first pixels that is an average of the signals, which correspond to the first pixels of the corresponding pixel column, among the signals subject to the calculating by the signal average calculating unit. The first average calculating unit calculates each first average of the second pixels that is an average of the signals, which correspond to the second pixels of the corresponding pixel column, among the signals subject to the calculating by the signal average calculating unit. The storage control unit stores, in the storage unit, the first linear functions generated by the first linear function generating unit and the first averages of the first pixels and the first averages of the second pixels, which are calculated by the first average calculating unit, in association with each other.

[10] According to further another aspect of the invention, an imaging apparatus includes a solid-state imaging device, a dark current correcting unit, a temperature detecting unit, a storage unit and a second linear function generating unit. In the solid-state imaging device, at least one pixel column including a plurality of pixels arrayed in a column direction on a semiconductor substrate, is arrayed in a row direction perpendicular to the column direction on the semiconductor substrate. The solid-state imaging device includes a charge transfer section provided corresponding to the pixel column. The charge transfer section transfers electric charges, which are generated in the pixel column corresponding to the charge transfer section, in the column direction. The dark current correcting unit that performs dark current correction based on a second linear function that expresses a level of a dark current using a position coordinate of each light receiving pixel as a variable. The dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the charge transfer section. The temperature detecting unit detects a temperature around the solid-state imaging device. Dark current acquisition drive for driving the solid-state imaging device is performed in advance of the imaging and separately from the imaging. The storage unit stores a first linear function in association with temperature information around the solid-state imaging device which is detected by the temperature detecting unit during the dark current acquisition drive. The first linear function expresses a level of a dark current superimposed on a signal corresponding to each light receiving pixel, using a position coordinate of each light receiving pixel as a variable. The second linear function generating unit generates the second linear function by multiplying respective terms of the first linear function stored in the storage unit by a ratio of temperature information detected by the temperature detecting unit during the imaging to the temperature information corresponding to the first linear function.

[11] In the imaging apparatus of [10], the first linear function stored in the storage unit may be generated using an average of signals acquired from the corresponding charge transfer section by performing the dark current acquisition drive plural times under a condition where the temperature around the solid-state imaging device is equal.

[12] The imaging apparatus of [10] may further include a driving unit, a first linear function generating unit and a storage control unit. The driving unit performs the dark current acquisition drive in a mode for generating the first linear function. The first linear function generating unit generates the first linear function based on the signals, which are acquired from the corresponding charge transfer section by the dark current acquisition drive. The storage control unit stores, in the storage unit, temperature information detected by the temperature detecting unit during the dark current acquisition drive and the first linear function generated by the first linear function generating unit in association with each other.

[13] The imaging apparatus of [11] may further include a driving unit, a signal average calculating unit, a first linear function generating unit and a storage control unit. The driving unit performs the dark current acquisition drive plural times in a mode for generating the first linear function. The signal average calculating unit calculates an average of signals acquired from the corresponding charge transfer section by performing the dark current acquisition drive the plural times. The first linear function generating unit generates the first linear function based on signals, which correspond to the light receiving pixels of the pixel column, among the signals subject to the calculating by the signal average calculating unit. The storage control unit stores, in the storage unit, temperature information detected by the temperature detecting unit during the dark current acquisition drive and the first linear function generated by the first linear function generating unit in association with each other.

[14] According to still another aspect of the invention, an imaging apparatus is capable of switching between (i) a first mode in which functions of the respective units of the imaging apparatus of [1] are executed and (ii) a second mode in which functions of the respective units of the imaging apparatus of any of [2], [3], [4], [7], [10] and [11] are executed. The first mode is executed when a prediction value of the level of the dark current superimposed on the electric charge generated in each light receiving pixel of the pixel column by the imaging is larger than a threshold value. The second mode is executed when the prediction value is smaller than the threshold value.

[15] The imaging apparatus of [14] may further include a prediction value determining unit that determines the prediction value based on at least an average of first-pixel signals which are acquired from the first pixels of the pixel column by the imaging among the average of the first-pixel signals and an average of second-pixel signals, which are acquired from the second pixels of the pixel column by the imaging.

[16] The imaging apparatus of [14] may further include a prediction value determining unit that determines the prediction value based on temperature around the solid-state imaging device during the imaging.

[17] The imaging apparatus of any of [1] to [16] may further include an operation control unit that switches ON/OFF of an operation of the dark current correcting unit according to a photographing condition.

[18] According to still further another aspect of the invention, a signal processing method processes signals acquired from a solid-state imaging device in which a plurality of pixel columns, each including a plurality of pixels arrayed in a column direction on a semiconductor substrate, are arrayed in a row direction perpendicular to the column direction on the semiconductor substrate. The solid-state imaging device includes charge transfer sections provided corresponding to the respective pixel columns. Each charge transfer section transfers electric charges, which are generated in the pixel column corresponding to each charge transfer section, in the column direction. The plurality of pixels of each pixel column include a plurality of first pixels for acquisition of dark current level, disposed at an end portion of the corresponding charge transfer section on an upstream side in a charge transfer direction; a plurality of second pixels for acquisition of dark current level, disposed at an end portion of the charger transfer section on a downstream side in the charge transfer direction; and a plurality of light receiving pixels disposed between the first pixels and the second pixels. The method includes: performing dark current correction based on a linear function for correction that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section; calculating an average of first-pixel signals, which are acquired from the respective first pixels of each pixel column by the imaging; calculating an average of second-pixel signals, which are acquired from the respective second pixels of each pixel column by the imaging; setting the average of the first-pixel signals of each pixel column to a level of a dark current superimposed on a signal corresponding to an electric charge, which is generated in a light receiving pixel adjacent to the first pixels of each pixel column by the imaging; setting the average of the second-pixels signals of each pixel column to a level of a dark current superimposed on a signal corresponding to an electric charge, which is generated in a light receiving pixel adjacent to the second pixels of each pixel column by the imaging; and generating the linear function for correction using the average of the first-pixel signals of each pixel column, the average of the second-pixel signals of each pixel column, and number of the light receiving pixels of each pixel column.

[19] According to still further another aspect of the invention, a signal processing method processes signals acquired from a solid-state imaging device in which a plurality of pixel columns, each including a plurality of pixels arrayed in a column direction on a semiconductor substrate, are arrayed in a row direction perpendicular to the column direction on the semiconductor substrate. The solid-state imaging device includes charge transfer sections provided corresponding to the respective pixel columns. Each charge transfer section transfers electric charges, which are generated in the pixel column corresponding to each charge transfer section, in the column direction. The plurality of pixels of each pixel column include a plurality of first pixels for acquisition of dark current level, disposed at an end portion of the corresponding charge transfer section on an upstream side in a charge transfer direction; a plurality of second pixels for acquisition of dark current level, disposed at an end portion of the charger transfer section on a downstream side in the charge transfer direction; and a plurality of light receiving pixels disposed between the first pixels and the second pixels. The method includes: performing dark current correction based on a second linear function that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section, and dark current acquisition drive for driving the solid-state imaging device is performed in advance of the imaging and separately from the imaging; storing, in a storage unit, a first linear function in association with at least a first average of the first pixels, which is an average of signals corresponding to the respective first pixels among signals acquired by performing the dark current acquisition drive from the charge transfer section corresponding to each pixel column, wherein each first linear function expresses a level of a dark current superimposed on a signal corresponding to the light receiving pixel, using a position coordinate of the light receiving pixel as a variable; calculating at least a second average of the first pixels that is an average of signals acquired from the plurality of first pixels of each pixel column by the imaging; and generating a second linear function by multiplying respective terms of each stored first linear function by a ratio of the second average to the first average corresponding to each first linear function.

[20] In the signal processing method of [19], the storing may store, in the storage unit, the first linear function in association with a first average of the second pixels which is an average of signals corresponding to the respective second pixels among the signals acquired by performing the dark current acquisition drive from the charge transfer section corresponding to each pixel column. The method may further include: calculating a second average of the second pixels that is an average of signals acquired from the plurality of second pixels of each pixel column by the imaging. The generating may generate the second linear function by multiplying the respective terms of each first linear function stored in the storage unit by a ratio of a difference between the second average of the first pixels and the second average of the second pixels to a difference between the first average of the first pixels and the first average of the second pixels, which correspond to each first linear function.

[21] In the signal processing method of [19], each first linear function and each first average of the first pixels, which are stored in the storage unit, may be generated using an average of signals acquired from the corresponding charge transfer section by performing the dark current acquisition drive plural times.

[22] In the signal processing method of [19], the performing of the dark current acquisition drive may perform the dark current acquisition drive in a mode for generating the first linear functions. The method may further include: generating each first linear function based on the signals, which are acquired from the corresponding charge transfer section by the dark current acquisition drive; and calculating each first average of the first pixels which is the average of the signals corresponding to the respective first pixels among the signals acquired by performing the dark current acquisition drive from the corresponding charge transfer section. The storing may store, in the storage unit, the generated first linear functions and the calculated first averages of the first pixels calculated in association with each other.

[23] In the signal processing method of [21], the performing of the dark current acquisition drive may perform the dark current acquisition drive plural times in a mode for generating the first linear functions. The method may further include: calculating the average of the signals acquired from the corresponding charge transfer section of each pixel column by performing the dark current acquisition drive the plural times; generating each first linear function based on signals, which correspond to the light receiving pixels of the corresponding pixel column, among the signals subject to the calculating of the average of the signals;

and calculating each first average of the first pixels that is the average of the signals, which correspond to the first pixels of the corresponding pixel column, among the signals subject to the calculating of the average of the signals. The storing may store, in the storage unit, the generated first linear functions and the calculated first averages of the first pixels in association with each other.

[24] In the signal processing method of [20], each first linear function, each first average of the first pixels and each first average of the second pixels, which are stored in the storage unit, may be generated using an average of the signals acquired from the corresponding charge transfer section by performing the dark current acquisition drive plural times.

[25] In the signal processing method of [20], the performing of the dark current acquisition drive may perform the dark current acquisition drive in a mode for generating the first linear functions. The method may further include: generating each first linear function based on the signals, which are acquired from the corresponding charge transfer section by the dark current acquisition drive; calculating each first average of the first pixels which is the average of the signals corresponding to the respective first pixels among the signals acquired by performing the dark current acquisition drive from the corresponding charge transfer section; and calculating each first average of the second pixels which is an average of signals corresponding to the respective second pixels among the signals acquired by performing the dark current acquisition drive from the corresponding charge transfer section. The storing may store, in the storage unit, the generated first linear functions, the calculated first averages of the first pixels and the calculated first averages of the second pixels in association with each other.

[26] In the signal processing method of [24], the performing of the dark current acquisition drive may perform the dark current acquisition drive plural times in a mode for generating the first linear functions. The method may further include: calculating an average of the signals acquired from the corresponding charge transfer section of each pixel column by performing the dark current acquisition drive the plural times; generating each first linear function based on signals, which correspond to the light receiving pixels of the corresponding pixel column, among the signals subject to the calculating of the average of the signals; calculating each first average of the first pixels that is an average of the signals, which correspond to the first pixels of the corresponding pixel column, among the signals subject to the calculating of the average of the signals; and calculating each first average of the second pixels that is an average of the signals, which correspond to the second pixels of the corresponding pixel column, among the signals subject to the calculating of the average of the signal. The storing may store, in the storage unit, the generated first linear functions, the calculated first averages of the first pixels and the calculated first averages of the second pixels in association with each other.

[27] According to still further another aspect of the invention, a signal processing method processes signals acquired from a solid-state imaging device in which at least one pixel column including a plurality of pixels arrayed in a column direction on a semiconductor substrate, is arrayed in a row direction perpendicular to the column direction on the semiconductor substrate. The solid-state imaging device includes a charge transfer section provided corresponding to the pixel column. The charge transfer section transfers electric charges, which are generated in the pixel column corresponding to the charge transfer section, in the column direction. The method includes: performing dark current correction based on a second linear function that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the charge transfer section; detecting a temperature around the solid-state imaging device, wherein dark current acquisition drive for driving the solid-state imaging device is performed in advance of the imaging and separately from the imaging, a first linear function is stored in a storage unit in association with temperature information around the solid-state imaging device, which is detected during the dark current acquisition drive, and the first linear function expresses a level of a dark current superimposed on a signal corresponding to each light receiving pixel, using a position coordinate of each light receiving pixel as a variable; and generating the second linear function by multiplying respective terms of the first linear function stored in the storage unit by a ratio of temperature information, which is detected during the imaging, to the temperature information corresponding to the first linear function.

[28] In the signal processing method of [27], the first linear function stored in the storage unit may be generated using an average of signals acquired from the corresponding charge transfer section by performing the dark current acquisition drive plural times under a condition where the temperature around the solid-state imaging device is equal.

[29] In the signal processing method of [27], the performing of the dark current acquisition drive may perform the dark current acquisition drive in a mode for generating the first linear function. The method may further include: generating the first linear function based on the signals, which are acquired from the corresponding charge transfer section by performing the dark current acquisition drive; and storing, in the storage unit, temperature information which is detected during the dark current acquisition drive and the generated first linear function in association with each other.

[30] In the signal processing method of [28], the performing of the dark current acquisition drive may perform the dark current acquisition drive plural times in a mode for generating the first linear function. The method may further include: calculating an average of signals acquired from the corresponding charge transfer section by performing the dark current acquisition drive the plural times; generating the first linear function based on signals, which correspond to the light receiving pixels of the pixel column, among the signals subject to the calculating of the average of the signals; and storing, in the storage unit, temperature information which is detected during the dark current acquisition drive and the generated first linear function in association with each other.

[31] According to still further another aspect of the invention, a signal processing method is capable of switching between (i) a first mode in which the respective steps of the method of [18] are executed and (ii) a second mode in which the respective steps of the method of any of [19], [20], [21], [24], [27] and [28] are executed. The method includes: executing the first mode when a prediction value of the level of the dark current superimposed on the electric charge generated in each light receiving pixel of the pixel column by the imaging is larger than a threshold value; and executing the second mode when the prediction value is smaller than the threshold value.

[32] The signal processing method of [31] may further include determining the prediction value based on at least an average of first-pixel signals which are acquired from the first pixels of the pixel column by the imaging among the average of the first-pixel signals and an average of second-pixel signals, which are acquired from the second pixels of the pixel column by the imaging.

[33] The signal processing method of [31] may further include determining the prediction value based on temperature around the solid-state imaging device during the imaging.

[34] The signal processing method of any of [17] to [33] may further include switching between the performing of the dark current correction and non-performing of the dark current correction, according to a photographing condition.

According to any of the above configurations, it is possible to provide an imaging apparatus capable of shortening a time period taken until dark current correction and decreasing power consumption.

DETAILED DESCRIPTION OF EMBODIMENTS OF THE INVENTION

Hereinafter, embodiments of the invention will be described with reference to the accompanying drawings.

First Embodiment

Figure 1:
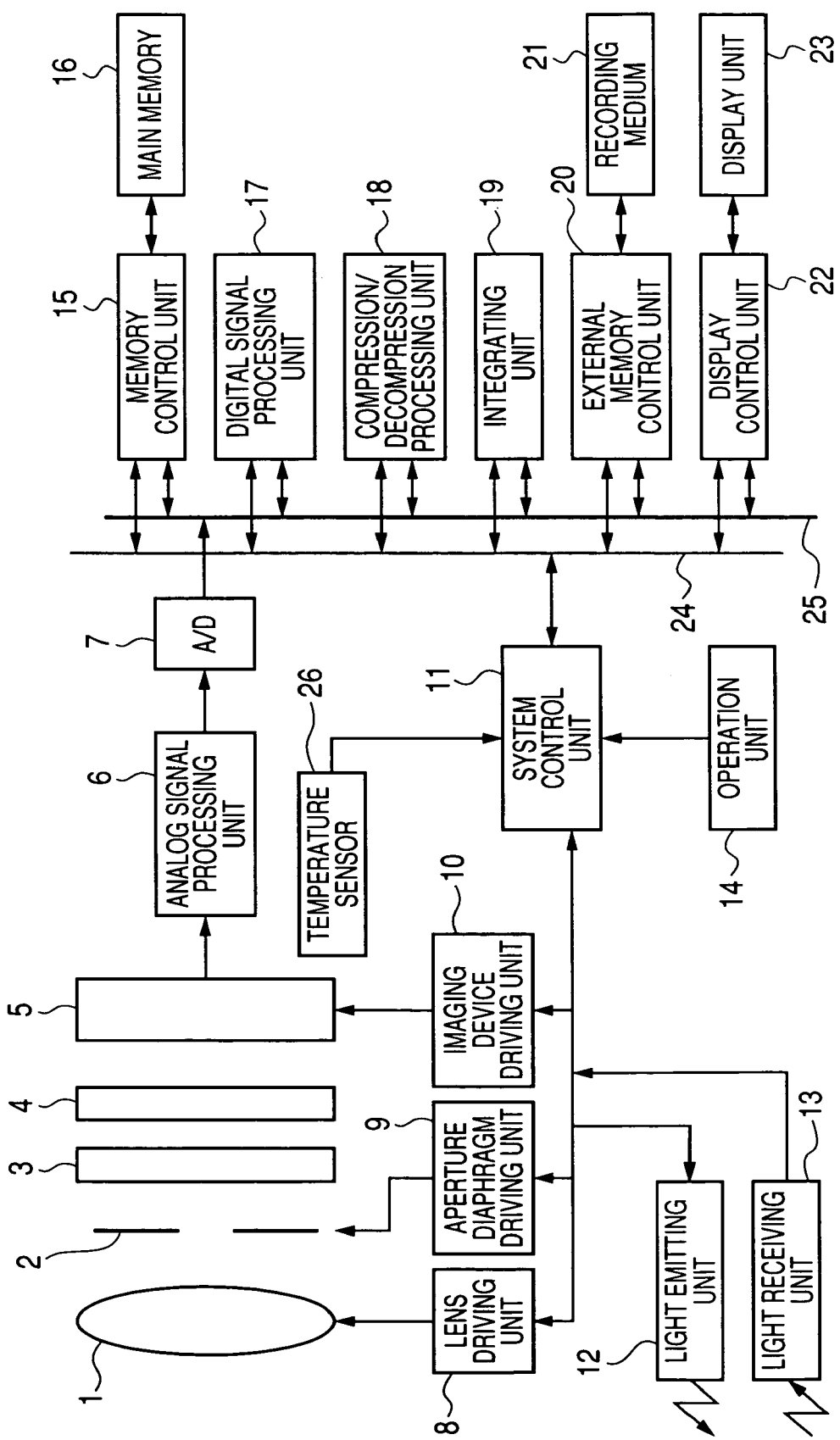
FIG. 1 is a functional block diagram illustrating a digital camera that is an example of an imaging apparatus, for describing an embodiment of the invention.

FIG. 1 is a functional block diagram illustrating a digital camera that is an example of an imaging apparatus, for describing an embodiment of the invention.

An imaging system of the digital camera shown in FIG. 1 includes an imaging lens 1, a CCD type solid-state imaging device 5, an aperture diaphragm 2 provided between the imaging lens 1 and the solid-state imaging device 5, an infrared cut filter 3, and an optical low pass filter 4. A temperature sensor 26 serving as a temperature detecting unit that detects temperatures around the solid-state imaging device 5 is provided near the solid-state imaging device 5. Temperature information detected by the temperature sensor 26 is transmitted to a digital signal processing unit 17 through a system control unit 11.

The system control unit 11 that collectively controls the entire electric control system of the digital camera controls a flashlight emitting unit 12 and a light receiving unit 13. Also, the system control unit 11 controls a lens driving unit 8 to adjust a position of the imaging lens 1 to a focusing position or to perform a zoom adjustment, and controls the aperture of the aperture diaphragm 2 through an aperture diaphragm driving unit 9 so as to adjust an amount of exposed light.

Moreover, the system control unit 11 drives the solid-state imaging device 5 through an imaging device driving unit 10 and outputs a subject image, which is imaged through the imaging lens 1, as a color signal. A command signal from a user is input to the system control unit 11 through an operation unit 14.

Further, the electric control system of the digital camera includes: an analog signal processing unit 6 that is connected to an output of the solid-state imaging device 5 and performs analog signal processing such as correlated double sampling processing; and an A/D conversion circuit 7 that converts RGB color signals, which are output from the analog signal processing unit 6, into digital signals. The analog signal processing unit 6 and the A/D conversion circuit 7 are controlled by the system control unit 11.

Furthermore, the electric control system of the digital camera includes: a main memory 16; a memory control unit 15 connected to the main memory 16; a digital signal processing unit 17 that performs dark current correction, an interpolating operation, a correction operation, RGB/YC conversion processing, and the like to generate image data; a compression/decompression processing unit 18 that compresses image data generated by the digital signal processing unit 17 in a JPEG format or decompresses the compressed data; an integrating unit 19 that integrates photometric data and calculates a gain of white balance correction performed by the digital signal processing unit 17; an external memory control unit 20 to which a detachable recording medium 21 is connected; and a display control unit 22 connected with a liquid crystal display unit 23 mounted on a back surface of the camera. These components are connected to one another through a control bus 24 and a data bus 25, and are controlled based on a command from the system control unit 11. The digital signal processing unit 17 is configured to include a processor operated by a predetermined program as a main component.

Figure 2:
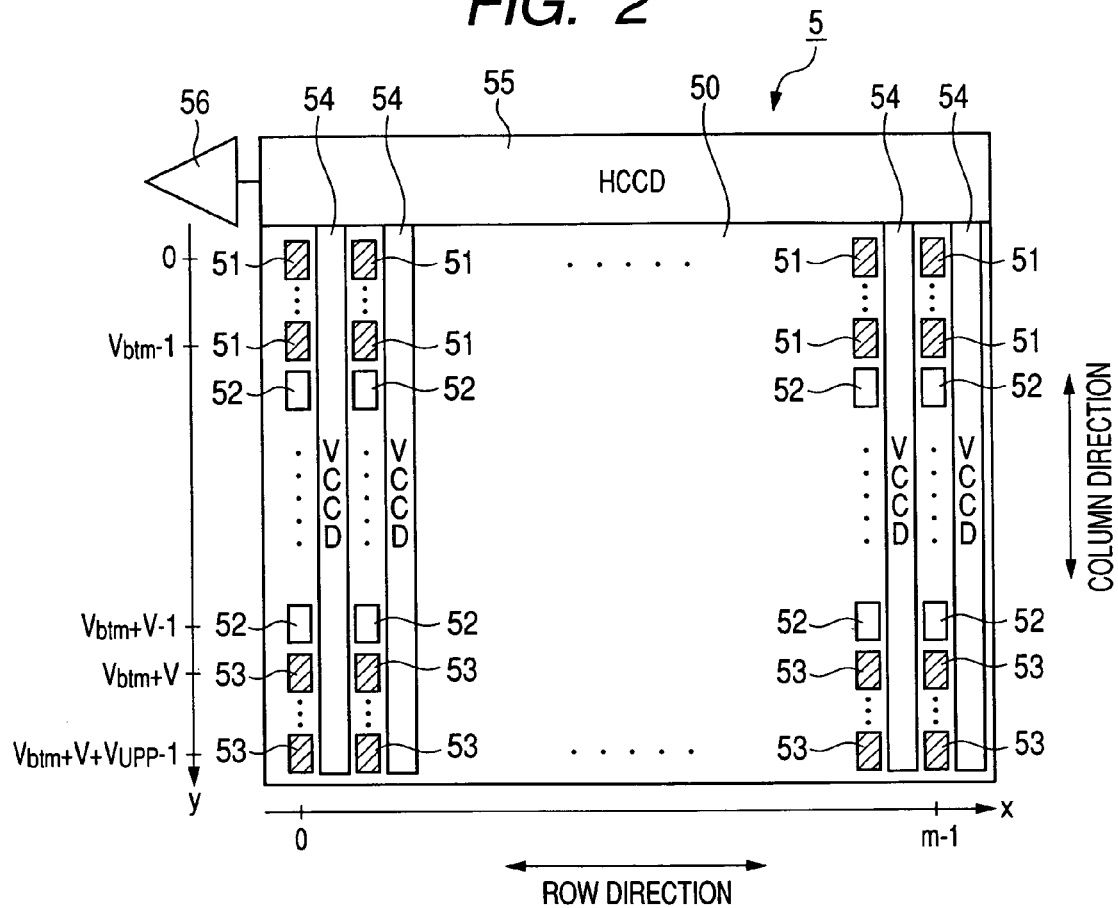
FIG. 2 is a plan view schematically illustrating a solid-state imaging device 5 shown in FIG. 1.

FIG. 2 is a plan view schematically illustrating the solid-state imaging device 5 shown in FIG. 1.

The solid-state imaging device 5 includes 'm' ('m' is a natural number equal to or larger than 1) pixel columns each including a plurality of pixels, such as '$V_{btm}$' ('$V_{btm}$' is a natural number equal to or larger than 2) black level detecting pixels (for example, a light-shielded photoelectric conversion element or a dummy photoelectric conversion element not existing actually; hereinafter, referred to as 'OB') 51 arrayed in a column direction on a semiconductor substrate 50, 'V' ('V' is a natural number equal to or larger than 1) light receiving pixels (for example, a photoelectric conversion element that is not shielded from light; hereinafter, referred to as 'PD') 52, and 'V$_{upp}$' ('V$_{upp}$' is a natural number equal to or larger than 2) pixels (for example, a light-shielded photoelectric conversion element or a dummy photoelectric conversion element not existing in actuality; hereinafter, referred to as 'OB') 53. The 'm' photoelectric-conversion-element columns are arrayed in the row direction perpendicular to the column direction.

The solid-state imaging device 5 includes a charge transfer section (VCCD) 54 provided so as to correspond to each of the 'm' pixel columns. The VCCD 54 transfers electric charges, which are generated in the pixel column corresponding to the VCCD 54, in the column direction (direction from a lower side to an upper side in the drawing).

The solid-state imaging device 5 includes a charge transfer section (HCCD) 55 that transfers electric charges, which are transferred from each of the 'm' VCCDs 54, in the row direction, and a signal output unit 56 that outputs signals corresponding to the electric charges transferred from the HCCD 55.

In addition, in this specification, the movement of electric charges transferred by the VCCD 54 is considered as one flow, and a relative position of each member may be specified as 'upstream of something', 'downstream of something', and the like as needed.

In each pixel column, the OBs 51 are disposed at an end portion of the VCCD 54 on a downstream side in the charge transfer direction. Accordingly, the OBs 51 are hereinafter referred to as lower OBs 51. In each pixel column, the OBs 53 are disposed at an end portion of the VCCD 54 on an upstream side in the charge transfer direction. Accordingly, the OBs 53 are hereinafter referred to as upper OBs 53. The PDs 52 are disposed between the upper OBs 53 and the lower OBs 51.

In the solid-state imaging device 5 shown in FIG. 2, the position of each of the lower OBs 51, the PDs 52, and the upper OBs 53 in each pixel column is expressed as one point on a y coordinate axis extending in the column direction. The coordinate of the OB 51, which is closest to the HCCD 55, of each pixel column is set to 'y=0' and the coordinate of the OB 53, which is farthest from the HCCD 55, of each pixel column is set to 'y=V$_{btm}$+V+V$_{upp}$−1'. Also, the position of each of pixel columns provided in parallel in the row direction is expressed as one point on an x coordinate axis extending in the row direction. The coordinate of a pixel column at the most left side is set to 'x=0' and the coordinate of a pixel column at the most right side is set to 'x=m−1'.

Signals obtained by driving the VCCD 54, the HCCD 55, and the signal output 56 without reading electric charges from a plurality of pixels included in each pixel column in a state where the solid-state imaging device 5 is shielded from light correspond to a dark current that is a signal corresponding to a dark electric charge superimposed on electric charges generated in the plurality of pixels included in each pixel column, when the solid-state imaging device 5 images a subject and the electric charges generated in the plurality of pixels are transferred through the VCCD 54.

Figure 3:
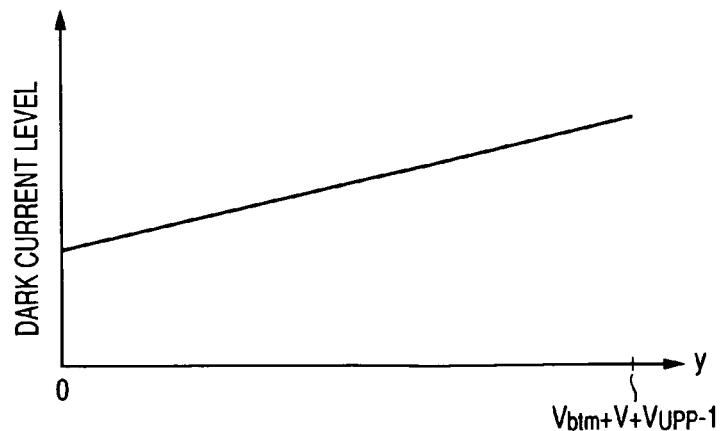
FIG. 3 is a view illustrating a relationship between y coordinates of pixels included in each pixel column and a level of a dark current (hereinafter, may be referred to as a dark current corresponding to each pixel column) superposed on signals acquired from the pixels included in each pixel column.

FIG. 3 is a view illustrating a relationship between y coordinates of the plurality of pixels included in each pixel column and a level of a dark current superimposed on signals acquired from the plurality of pixels included in each pixel column. As shown in FIG. 3, the level of the dark current corresponding to each pixel column is expressed as a linear function having the y coordinate as a variable. As the y coordinate increases, the level of the dark current also increases. In the related art, dark current acquisition drive for acquiring data as shown in FIG. 3 is performed separately from driving for imaging a photographic subject, in order to correct the dark current. As a result, power consumption increases.

In the digital camera according to this embodiment, the dark current correction can be performed only with the driving for imaging a photographic subject.

In the digital camera according to this embodiment, a dark current acquisition mode for storing data for dark current correction in the main memory 16 as well as a normal imaging mode in which the imaging device driving unit 10 drives the solid-state imaging device 5 to image a photographic substrate and a signal corresponding to an electric charge generated in each pixel is read out may be set. The dark current acquisition mode is a mode that can be set only before shipment of a digital camera. When the digital camera is set to the dark current acquisition mode, the imaging device driving unit 10 performs the dark current acquisition drive, plural times, for driving the VCCD 54, the HCCD 55, and the signal output unit 56 without reading electric charges from the photoelectric conversion elements 51, 52, and 53 under a state where the solid-state imaging device 5 is shielded from light. Alternatively, when the digital camera is set to the dark current acquisition mode, the imaging device driving unit 10 may perform driving plural times with a charge reading pulse being not applied from the photoelectric conversion elements 51, 52, and 53 to the VCCD 54 under a state where the solid-state imaging device 5 is not shielded from light. If the dark current acquisition drive is performed once, signals corresponding to the plurality of photoelectric conversion elements included in a photoelectric-conversion-element column corresponding to each VCCD 54 are output from each VCCD 54.

Hereinafter, an explanation will be made assuming that a signal acquired from a pixel at a coordinate [y, x] at the time of imaging in an imaging mode is in[y, x]$_{imaging}$, a signal (upper OB signal) acquired from the upper OB 53 among the signals in[y, x]$_{imaging}$ is OB$_{upp}$[y, x]$_{imaging}$, a signal acquired from the PD 52 among the signals in[y, x]$_{imaging}$ is PD[y, x]$_{imaging}$, and a signal (lower OB signal) acquired from the lower OB 51 among the signals in[y, x]$_{imaging}$ is OB$_{btm}$[y, x]$_{imaging}$.

In addition, the explanation will be made assuming that a signal which corresponds to a pixel at a coordinate [y, x] and which is acquired from the solid-state imaging device 5 at the time of the dark current acquisition drive is in[y, x]$_{dark}$, a signal (upper OB signal) corresponding to the upper OB 53 among the signals in[y, x]$_{dark}$ is OB$_{upp}$[y, x]$_{dark}$, a signal corresponding to the PD 52 among the signals in[y, x]$_{dark}$ is PD[y, x]$_{dark}$, and a signal (lower OB signal) corresponding to the lower OB 51 among the signals in[y, x]$_{dark}$ is OB$_{btm}$[y, x]$_{dark}$.

Figure 4:
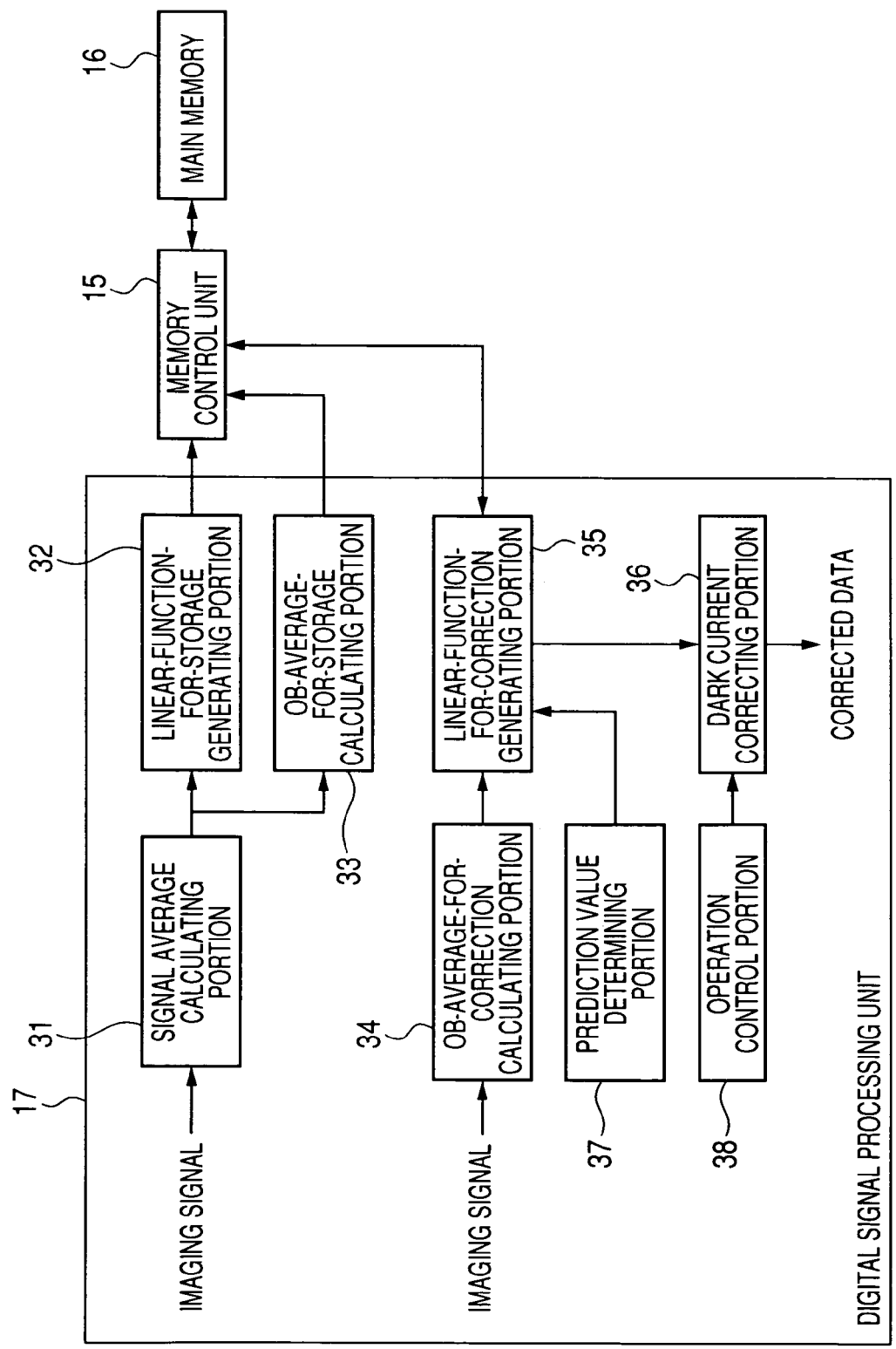
FIG. 4 is a view illustrating functional blocks of a digital signal processing unit shown in FIG. 1.

FIG. 4 is a view illustrating functional blocks of the digital signal processing unit 17 shown in FIG. 1.

The digital signal processing unit 17 includes a signal average calculating portion 31, a linear-function-for-storage generating portion 32, a OB-average-for-storage calculating portion 33, a OB-average-for-correction calculating portion 34, a linear-function-for-correction generating portion 35, a dark current correcting portion 36, a prediction value determining portion 37, and an operation control portion 38.

The signal average calculating portion 31 calculates a signal Ave[y, x] that is an average of data at the same coordinate of the signal in[y, x]$_{dark}$ obtained from the solid-state imaging device 5 by performing the dark current acquisition drive the plural times. By this processing, the signal Ave[y, x] from which a random noise generated in the signal output unit 56 is removed can be acquired.

The linear-function-for-storage generating portion 32 generates a linear function for storage f(y) (refer to Expression (1)) that expresses a value at each y coordinate when 'x' of the signal Ave[y, x] is set to a fixed value using a linear function having 'y' as a variable. The linear function for storage f(y) is generated with a least square method, for example. Since a value of the signal Ave[y, x] corresponds to a dark current superimposed on a signal acquired from a pixel at a coordinate [y, x], it is possible to find out, from the linear function for storage f(y), a level of a dark current included in each signal, which is acquired from the solid-state imaging device 5 when performing imaging in the same condition as in the dark current acquisition drive. 'a' and 'b' in Expression (1) are coefficients determined by a level of the signal Ave[y, x]. The linear-function-for-storage generating portion 32 generates 'm' linear functions for storage corresponding to the respective pixel columns.

$$f(y) = ay + b \quad (1)$$

Of the signals Ave[y, x], the OB-average-for-storage calculating portion 33 calculates '$OB_{btm}[x]_{dark}$', which is an average of lower OB signals corresponding to the lower OBs 51 of a pixel column at an arbitrary coordinate x, using the following expression (2) and also calculates '$OB_{upp}[x]_{dark}$', which is an average of upper OB signals corresponding to the upper OBs 53 of the pixel column at the arbitrary coordinate x, using the following expression (3). Since '$OB_{btm}[x]_{dark}$' and '$OB_{upp}[x]_{dark}$' are stored in the main memory 16, '$OB_{btm}[x]_{dark}$' and '$OB_{upp}[x]_{dark}$' are called OB averages for storage.

$$OB_{btm}[x]_{dark} = \frac{1}{V_{btm}} \sum_{y=0}^{V_{btm}-1} Ave[y, x] \quad (2)$$

$$OB_{upp}[x]_{dark} = \frac{1}{V_{upp}} \sum_{y=V_{btm}+V}^{V_{btm}+V+V_{upp}-1} Ave[y, x] \quad (3)$$

The memory control unit 15 stores, in the main memory 16, the linear function for storage obtained at an arbitrary coordinate 'x', '$OB_{btm}[x]_{dark}$' at the same coordinate 'x', and '$OB_{upp}[x]_{dark}$' at the same coordinate 'x' in association with each other.

The OB-average-for-correction calculating portion 34 calculates '$OB_{btm}[x]_{imaging}$', which is an average of lower OB signals that are acquired from the lower OBs 51 of a pixel column at an arbitrary coordinate x by imaging in the imaging mode, using the following expression (4). Also, the OB-average-for-correction calculating portion 34 calculates '$OB_{upp}[x]_{imaging}$', which is an average of upper OB signals that are acquired from the upper OBs 51 of the pixel column at the arbitrary coordinate x by the imaging in the imaging mode, using the following expression (5). Since '$OB_{btm}[x]_{imaging}$' and '$OB_{upp}[x]_{imaging}$' are used for the dark current correction, '$OB_{btm}[x]_{imaging}$' and '$OB_{upp}[x]_{imaging}$' are called OB averages for correction.

$$OB_{btm}[x]_{imaging} = \frac{1}{V_{btm}} \sum_{y=0}^{V_{btm}-1} in[y, x] \quad (4)$$

$$OB_{upp}[x]_{imaging} = \frac{1}{V_{upp}} \sum_{y=V_{btm}+V}^{V_{btm}+V+V_{upp}-1} in[y, x] \quad (5)$$

The prediction value determining portion 37 determines a prediction value of a dark current level in PD[y, x]$_{imaging}$ acquired from the solid-state imaging device 5 by the imaging in the imaging mode. The prediction value determining portion 37 determines the prediction value based on at least '$OB_{upp}[x]_{imaging}$' of '$OB_{btm}[x]_{imaging}$' and '$OB_{upp}[x]_{imaging}$'. For example, the prediction value determining portion 37 determines '$OB_{upp}[x]_{imaging}$' at the arbitrary coordinate X as a prediction value or determines a value, which is obtained by subtracting '$OB_{btm}[x]_{imaging}$' at the arbitrary coordinate X from '$OB_{upp}[x]_{imaging}$' at the same coordinate X, as a prediction value. Alternatively, the prediction value determining portion 37 determines the prediction value based on information about temperature around the solid-state imaging device 5 that is detected by the temperature sensor 26 at the time of the imaging in the imaging mode.

The linear-function-for-correction generating portion 35 generates a linear function for correction F(y) for use in the dark current correction for PD[y, x]$_{imaging}$ acquired from the solid-state imaging device 5 by the imaging in the imaging mode. If the prediction value determined by the prediction value determining portion 37 is larger than a threshold value (a maximum value of a level of a random noise resulting from the signal output unit 56), the linear-function-for-correction generating portion 35 generates the linear function for correction F(y) in a first mode without considering an influence of the random noises because the influence of the random noises can be neglected. On the other hand, if the prediction value determined by the prediction value determining portion 37 is smaller than the threshold value, the linear-function-for-correction generating portion 35 generates the linear function for correction F(y) in a second mode in consideration of the influence of the random noises because the influence of the random noises cannot be neglected. Hereinafter, a function of the linear-function-for-correction generating portion 35 in each of the first and second modes will be described separately.

(First Mode)

Figure 5:
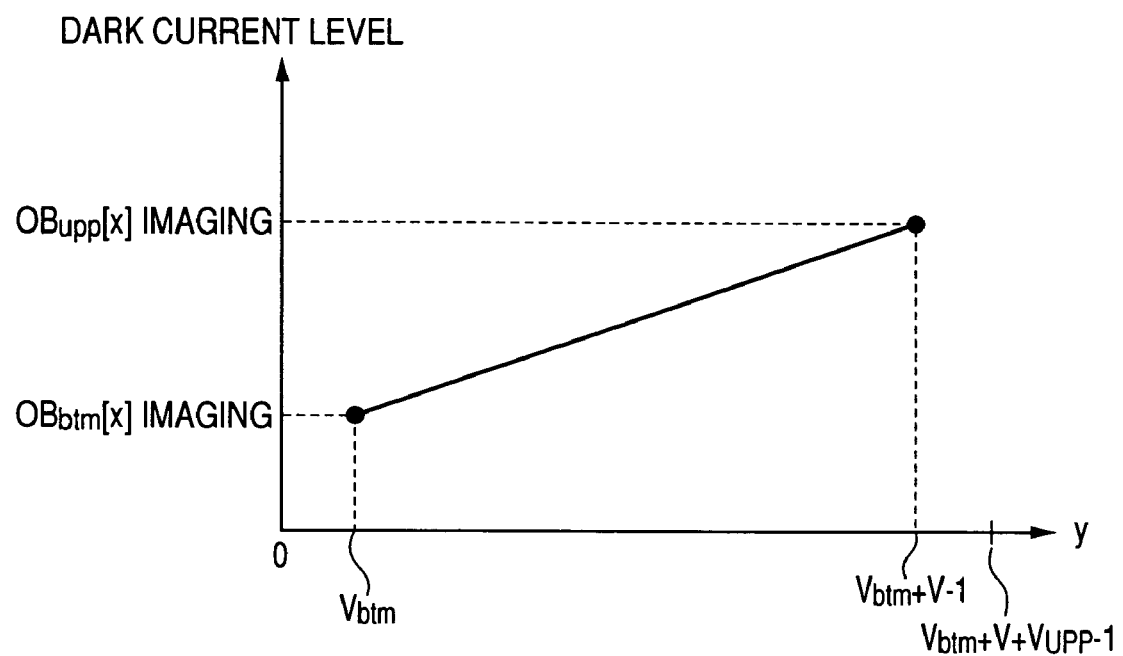
FIG. 5 is a view explaining a method for acquiring a linear function for correction.

The linear-function-for-correction generating portion 35 sets '$OB_{upp}[x]_{imaging}$' as a level of a dark current superimposed on a signal corresponding to an electric charge generated, by the imaging in the imaging mode, in the PD 52 adjacent to the upper OB 53, among the PDs 52 of a pixel column at the coordinate X. Also, the linear-function-for-correction generating portion 35 sets '$OB_{btm}[x]_{imaging}$' as a level of a dark current superimposed on a signal corresponding to an electric charge generated, by the imaging in the imaging mode, in the PD 52 adjacent to the lower OB 51, among the PDs 52 of a pixel column corresponding to the coordinate X. That is, as shown in FIG. 5, the linear-function-for-correction generating portion 35 sets PD[y=$V_{btm}$, x]$_{imaging}$=$OB_{btm}[x]_{imaging}$ and PD[y=$V_{btm}$+V−1, x]$_{imaging}$=$OB_{upp}[x]_{imaging}$. Also, the linear-function-for-correction generating portion 35 calculates the linear function F(y) indicating a straight line that connects $OB_{btm}[x]_{imaging}$ with $OB_{upp}[x]_{imaging}$, using the following Expression (6). The calculated function is assumed to be the linear function for correction.

$$F(y) = \left\{ \frac{OB_{upp}[x]_{imaging} - OB_{btm}[x]_{imaging}}{V} \right\} y + OB_{btm}[x]_{imaging} \quad (6)$$

Thus, in the first mode, even in the case where there is a variation between upper OB signals from the OBs 51 included in the same pixel column and lower OB signals from the OBs 53 included in the same pixel column, the linear function for correction F(y) is generated based on the average of the upper OB signals and the average of the lower OB signals in which the variation is averaged. Accordingly, since an influence of the variation in signals can be eliminated, it is possible to improve the precision of the dark current correction based on the linear function for correction F(y). On the other hand, the linear function for correction F(y) generated in the first mode is generated from the signals acquired by imaging single time. Accordingly, the linear function for correction F(y) generated in the first mode may be influenced by random noise components resulting from the signal output unit 56.

(Second Mode)

The linear-function-for-correction generating portion 35 generates the linear function for correction F(y) by performing operation processing expressed in the following Expression (7). That is, the linear-function-for-correction generating portion 35 generates the linear function for correction F(y) by multiplying respective terms of the linear function for storage f(y) at an arbitrary coordinate X stored in the main memory 16 by a ratio of a difference between '$OB_{upp}[x]_{imaging}$' and '$OB_{btm}[x]_{imaging}$' at the same coordinate X to a difference between '$OB_{upp}[x]_{dark}$' and '$OB_{btm}[x]_{dark}$' which are stored in association with the linear function for storage f(y).

$$F(y) = a \left\{ \frac{OB_{upp}[x]_{imaging} - OB_{btm}[x]_{imaging}}{OB_{upp}[x]_{dark} - OB_{btm}[x]_{dark}} \right\} y + \quad (7)$$
$$b \left\{ \frac{OB_{upp}[x]_{imaging} - OB_{btm}[x]_{imaging}}{OB_{upp}[x]_{dark} - OB_{btm}[x]_{dark}} \right\}$$

In this manner, in the second mode, the linear function for correction F(y) is generated by processing the linear function for storage f(y). Accordingly, since the linear function for correction F(y) that is not influenced by the random noises can be generated, the dark current correction can be precisely performed. However, in the case of the second mode, processing such as memory access, which is not included in the first mode, is required. For this reason, the processing in the second mode is more complicated than that in the first mode.

The dark current correcting portion 36 performs the dark current correction for $PD[y, x]_{imaging}$, which is acquired from the solid-state imaging device 5 by the imaging in the imaging mode, on the basis of the linear function for correction F(y). Since a dark current level in $PD[y, x]_{imaging}$ is acquired using Expression (6) or (7), the dark current correction is performed by executing an operation shown in the following Expression (8) or (9) in which the dark current level obtained in Expression (6) or (7) is subtracted from $PD[y, x]_{imaging}$, thereby obtaining a signal out[y, x] after correction.

$$\text{out}(y, x) = PD[y, x]_{imaging} - \left[ \left\{ \frac{OB_{upp}[x]_{imaging} - OB_{btm}[x]_{imaging}}{V} \right\} y + \quad (8) \right.$$
$$\left. OB_{btm}[x]_{imaging} \right]$$

$$\text{out}(y, x) = PD[y, x]_{imaging} - \left[ a \left\{ \frac{OB_{upp}[x]_{imaging} - OB_{btm}[x]_{imaging}}{OB_{upp}[x]_{dark} - OB_{btm}[x]_{dark}} \right\} y + \quad (9) \right.$$
$$\left. b \left\{ \frac{OB_{upp}[x]_{imaging} - OB_{btm}[x]_{imaging}}{OB_{upp}[x]_{dark} - OB_{btm}[x]_{dark}} \right\} \right]$$

The operation control portion 38 controls the operation of the dark current correcting portion 36 in accordance with photographing conditions, such as the temperature information from the temperature sensor 26 and photographing ISO sensitivity information set in a photographing mode. For example, the operation control portion 38 makes a control such that the dark current correcting portion 36 is stopped in a photographing condition that a dark current decreases at the time of low temperature or setting of low photographing ISO sensitivity. Also, the operation control portion 38 makes a control such that the dark current correcting portion 36 is operated in a photographing condition that a dark current increases at the time of high temperature or setting of high photographing ISO sensitivity. Since it is possible to realize an efficient operation by such control, the power consumption can be reduced.

Next, operations in the dark current acquisition mode and the imaging mode of the digital camera shown in FIG. 1 will be described.

Figure 6:
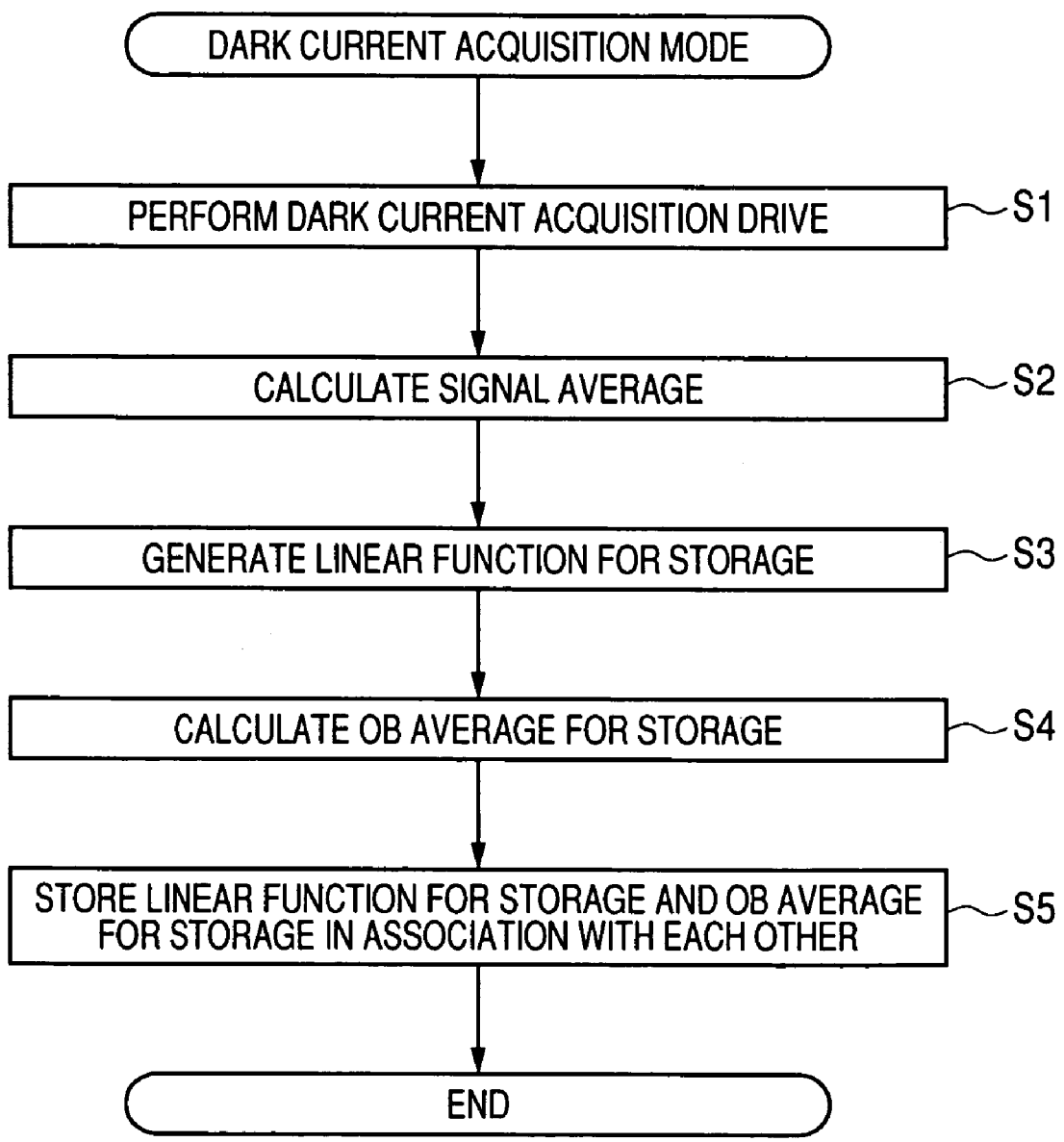
FIG. 6 is a view illustrating an operation flow in an imaging mode for adjustment of a digital camera according to a first embodiment.

FIG. 6 is a view illustrating an operation flow in the dark current acquisition mode of the digital camera according to the first embodiment.

If the dark current acquisition mode is set, the dark current acquisition drive is executed plural times (step S1), such that a plurality of signals $in[y, x]_{dark}$ are input to the digital signal processing unit 17. Then, Ave[y, x], which is an average of the signals $in[y, x]_{dark}$, is calculated (step S2). Then, a linear function for storage f(y) is generated from Ave[y, x] (step S3). Then, an OB average for correction ($OB_{btm}[x]_{dark}$ and $OB_{upp}[x]_{dark}$) is generated from Ave[y, x] (step S4). Then, the linear function for storage f(y) and the OB average for correction are stored in the main memory 16 in association with each other (step S5), and thus processing is completed.

Figure 7:
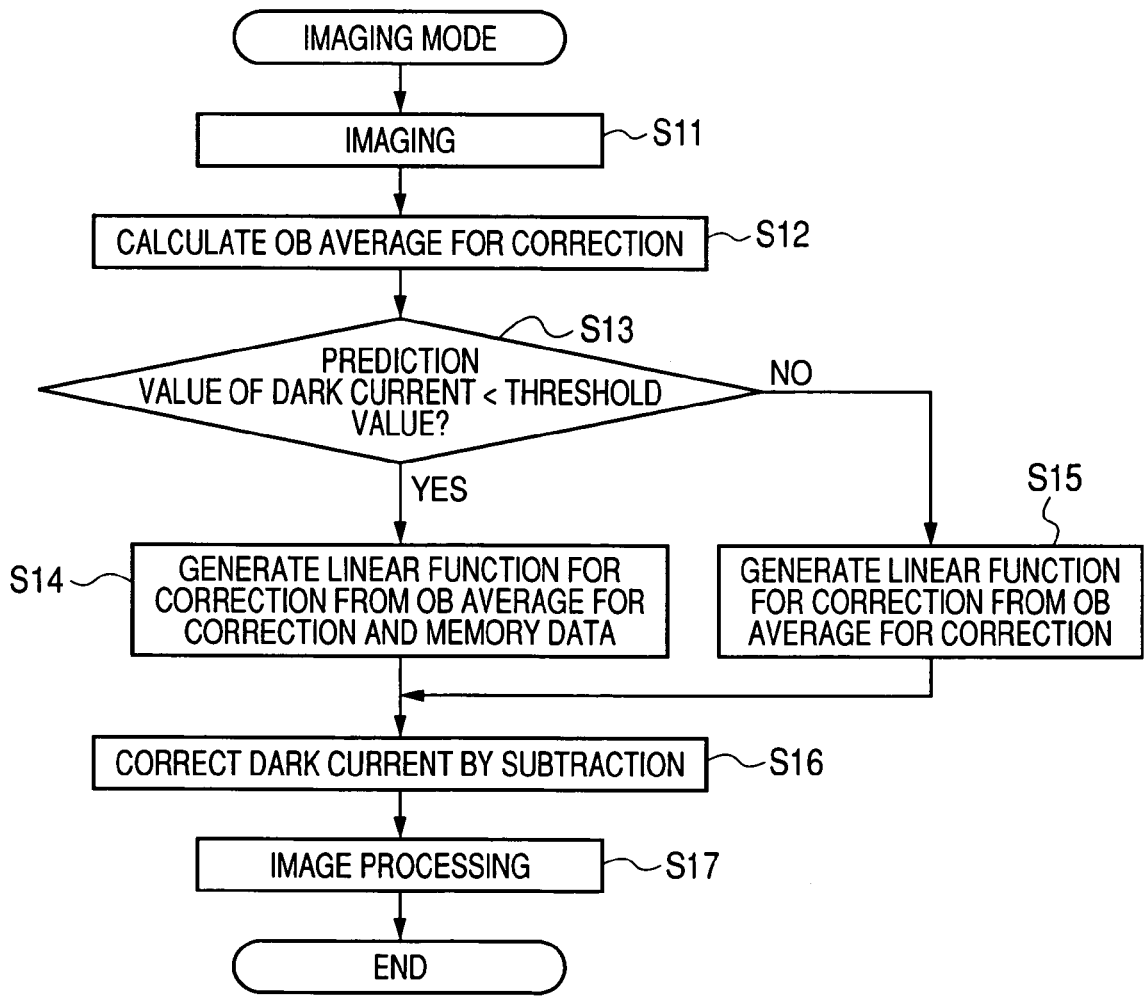
FIG. 7 is a view illustrating an operation flow in an imaging mode of the digital camera according to the first embodiment.

FIG. 7 is a view illustrating an operation flow in the imaging mode of the digital camera according to the first embodiment.

If the imaging mode is set to perform imaging (step S11), a signal $in[y, x]_{imaging}$ is input to the digital signal processing unit 17. Then, an OB average for correction ($OB_{btm}[x]_{imaging}$ and $OB_{upp}[x]_{imaging}$) is generated from the signal $in[y, x]_{imaging}$ (step S12).

Then, a prediction value of a dark current level is compared with a threshold value on the basis of temperature information at the time of the imaging or the OB average for correction. If the prediction value of the dark current level is smaller than the threshold value (step S13: YES), a linear function for correction F(y) is generated by the second mode (step S14). On the other hand, if the prediction value of the dark current level is larger than the threshold value (step S13: NO), the linear function for correction F(y) is generated by the first mode (step S15).

After the linear function for correction F(y) is generated, a dark current level is subtracted from $PD[y, x]_{imaging}$ acquired by the imaging in the imaging mode on the basis of the linear function for correction F(y) (step S16). Thereafter, predetermined image processing is performed to generate image data (step S17), and the generated image data is recorded in the recording medium 21.

As described above, in the digital camera according to this embodiment, the dark current correction for the signals acquired by the imaging in the imaging mode is performed based on the linear function for correction F(y) generated using the signals acquired by the imaging. Accordingly, it is not necessary to perform driving for acquisition of a dark current level separately from driving for the imaging. As a result, it is possible to shorten a time period taken until the dark current correction and to reduce the power consumption.

Further, in the digital camera according to this embodiment, when a prediction value of a dark current level is lower than a random noise level, the influence of random noises cannot be neglected. Accordingly, in this case, the image quality can be improved by adopting the second mode that allows the influence of the random noises to be eliminated as much as possible even though the processing becomes complicated. When the prediction value of the dark current level is higher than the random noise level, the influence of the random noises can be neglected. Accordingly, in this case, the processing speed can be increased by adopting the first mode that allows the processing to be simplified even though there may be the influence of the random noises. Thus, it becomes possible to perform efficient processing according to a situation.

In this embodiment, the linear-function-for-correction generating portion 35 generates the linear function for correction F(y) while switching between the first mode and the second mode according to a prediction value of a dark current level. However, the linear-function-for-correction generating portion 35 does not need to execute these two modes but may execute any one of the two modes in order to achieve the object of this application.

That is, the signal average calculating portion 31, the linear-function-for-storage generating portion 32, the OB-average-for-storage calculating portion 33, and the prediction value determining portion 37 shown in FIG. 4 may be eliminated, such that the linear-function-for-correction generating portion 35 generates a linear function for correction only with the first mode. Alternatively, the prediction value determining portion 37 shown in FIG. 4 may be eliminated, such that the linear-function-for-correction generating portion 35 generates the linear function for correction only with the second mode.

Moreover, in the case where the linear-function-for-correction generating portion 35 has a function of executing only the second mode, the signal average calculating portion 31 may be eliminated and the linear-function-for-storage generating portion 32 may generate a linear function for storage from a signal acquired by performing the dark current acquisition drive single time. In this manner, the object of this application can be achieved even though an influence of random noises cannot be eliminated.

Furthermore, in this embodiment, functions of the signal average calculating portion 31, the linear-function-for-storage generating portion 32, and the OB-average-for-storage calculating portion 33 are executed by the digital signal processing unit 17. However, these functions may be executed by an external computer to which transmitted are signals acquired from the solid-state imaging device 5 by adjustment imaging, and the linear function for storage f(y) generated in this external computer may be stored in the main memory 16.

Furthermore, in this embodiment, the linear-function-for-correction generating portion 35 generates the linear function for correction F(y) in the second mode, on the basis of the linear function for storage f(y), $OB_{upp}[x]_{dark}$ and $OB_{btm}[x]_{dark}$ corresponding thereto, and $OB_{upp}[x]_{imaging}$ and $OB_{btm}[x]_{imaging}$ at the same coordinate x. However, it is also possible to generate the linear function for correction F(y) on the basis of the linear function for storage f(y), $OB_{upp}[x]_{dark}$ corresponding thereto, and $OB_{upp}[x]_{imaging}$ at the same coordinate x. In this case, it is preferable that the linear-function-for-correction generating portion 35 generates the linear function for correction F(y) by performing the operation processing for multiplying the respective terms of the linear function for storage f(y) at an arbitrary coordinate X stored in the main memory 16, by a ratio of '$OB_{upp}[x]_{imaging}$' at the same coordinate X to '$OB_{upp}[x]_{dark}$' which is stored in association with the linear function for storage f(y).

Furthermore, in the case where the linear-function-for-correction generating portion 35 generates the linear function for correction F(y) on the basis of the linear function for storage f(y), the $OB_{upp}[x]_{dark}$ corresponding thereto, and $OB_{upp}[x]_{imaging}$ at the same coordinate x, it is preferable that the OB-average-for-correction calculating portion 34 calculate at least '$OB_{upp}[x]_{imaging}$', the OB-average-for-storage calculating portion 33 calculate at least '$OB_{upp}[x]_{dark}$' and the memory control unit 15 stores a linear function for storage acquired at an arbitrary coordinate X and '$OB_{upp}[x]_{dark}$' at the same coordinate X in association with each other.

Second Embodiment

A digital camera according to a second embodiment has the same configuration as in the first embodiment except that a part of functions of the digital signal processing unit 17 shown in FIG. 4 is changed. Hereinafter, only the changed part will be described.

Figure 8:
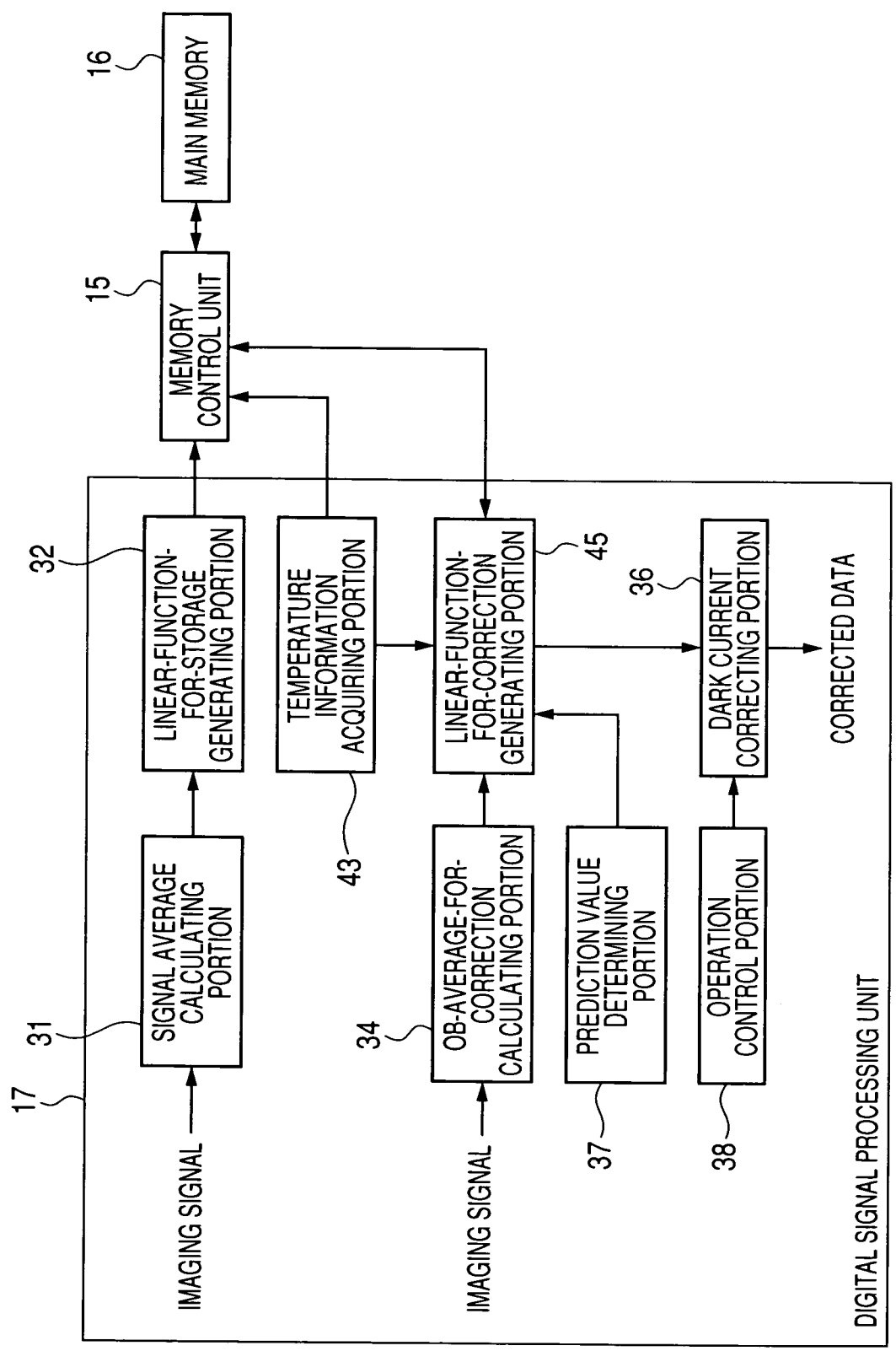
FIG. 8 is a view illustrating functional blocks of a digital signal processing unit of a digital camera according to a second embodiment of the invention.

FIG. 8 is a view illustrating functional blocks in a digital signal processing unit 17 of the digital camera according to the second embodiment of the invention. In FIG. 8, the same components as in FIG. 4 are denoted by the same reference numerals.

The digital signal processing unit 17 shown in FIG. 8 has the configuration that the linear-function-for-correction generating portion 35 is changed to a linear-function-for-correction generating portion 45, the OB-average-for-storage calculating portion 33 is removed, and a temperature information acquiring portion 43 is added instead of the OB-average-for-storage calculating portion 33 in the digital signal processing unit 17 shown in FIG. 4.

The temperature information acquiring portion 43 acquires temperature information $T_{dark}$ around the solid-state imaging device 5, which is detected by a temperature sensor 26 at the time of the dark current acquisition drive, and transmits the acquired temperature information $T_{dark}$ to the main memory 16. Also, the temperature information acquiring portion 43 acquires temperature information $T_{imaging}$ around the solid-state imaging device 5, which is detected by the temperature sensor 26 at the time of the imaging in an imaging mode, and transmits the acquired temperature information $T_{imaging}$ to the linear-function-for-correction generating portion 45.

The memory control unit 15 stores, in the main memory 16, a linear function for storage f(y) generated by the linear-function-for-storage generating portion 32 and the temperature information $T_{dark}$ acquired by the temperature information acquiring portion 43 in association with each other.

The linear-function-for-correction generating portion 45 generates a linear function for correction F(y) for performing the dark current correction for $PD[y, x]_{imaging}$ which is acquired from the solid-state imaging device 5 by the imaging in the imaging mode. If a prediction value determined by the prediction value determining portion 37 is larger than a threshold value (a maximum value of a level of a random noise resulting from the signal output unit 56), the linear-function-for-correction generating portion 45 generates the linear function for correction F(y) in the first mode described above. On the other hand, if the prediction value determined by the prediction value determining portion 37 is smaller than the threshold value, the linear-function-for-correction generating portion 45 generates the linear function for correction F(y) in a third mode in which an influence of the random noises is considered. Hereinafter, the third mode will be explained.

(Third Mode)

The linear-function-for-correction generating portion 45 generates the linear function for correction F(y) by performing operation processing, which is expressed in the following Expression (10). For example, The linear-function-for-correction generating portion 45 generates the linear function for correction F(y) by multiplying respective terms of a linear function for storage f(y) stored in the main memory 16 by a ratio of the temperature information $T_{imaging}$ acquired in the temperature information acquiring portion 43 to the temperature information $T_{dark}$ stored in association with the linear function for storage f(y). In Expression (10), 'Eg' is an energy band gap of silicon and 'k' is a Boltzmann constant.

$$F(y) = a\left(\frac{T_{imaging}^2 \times \text{EXP}\frac{-Eg}{2kT_{imaging}}}{T_{dark}^2 \times \text{EXP}\frac{-Eg}{2kT_{dark}}}\right)y + b\left(\frac{T_{imaging}^2 \times \text{EXP}\frac{-Eg}{2kT_{imaging}}}{T_{dark}^2 \times \text{EXP}\frac{-Eg}{2kT_{dark}}}\right) \quad (10)$$

Thus, in the third mode, the linear function for correction F(y) is generated by processing the linear function for storage f(y). Accordingly, since the linear function for correction F(y) that is not influenced by random noises can be generated, the dark current correction can be precisely performed.

Next, operations in a dark current acquisition mode and an imaging mode of the digital camera according to this embodiment will be described.

Figure 9:
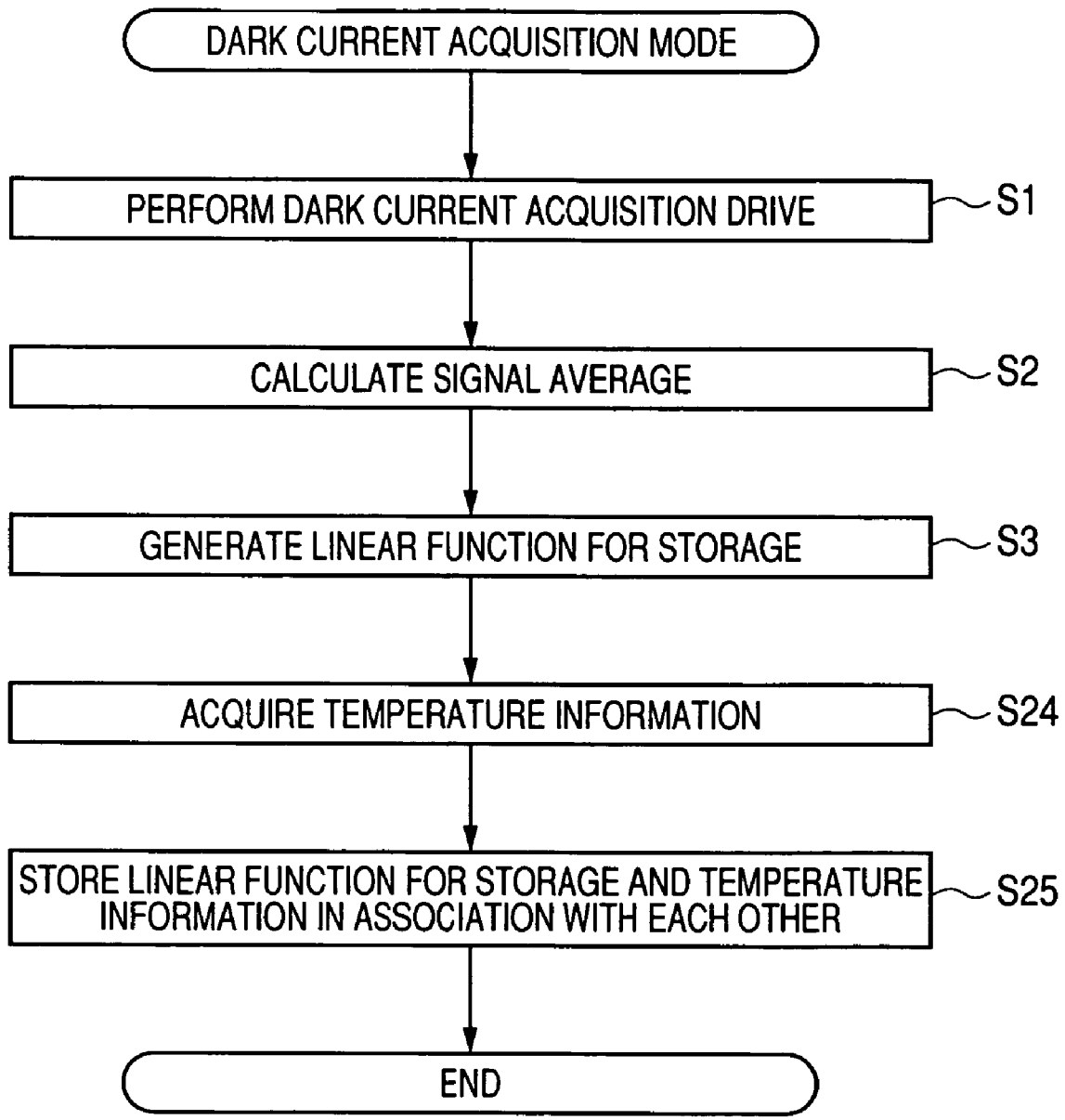
FIG. 9 is a view illustrating an operation flow in an imaging mode for adjustment of the digital camera according to the second embodiment.

FIG. 9 is a view illustrating an operation flow in the dark current acquisition mode of the digital camera according to the second embodiment. In FIG. 9, the same operation flow as in FIG. 6 is denoted by the same reference numeral.

After step S3, the temperature information $T_{dark}$ around the solid-state imaging device 5 at the time of the dark current acquisition drive in step S1 is acquired (step S24). Then, the acquired temperature information $T_{dark}$ and the linear function for storage f(y) generated in step S3 are stored in the main memory 16 in association with each other, and then the processing is completed.

Figure 10:
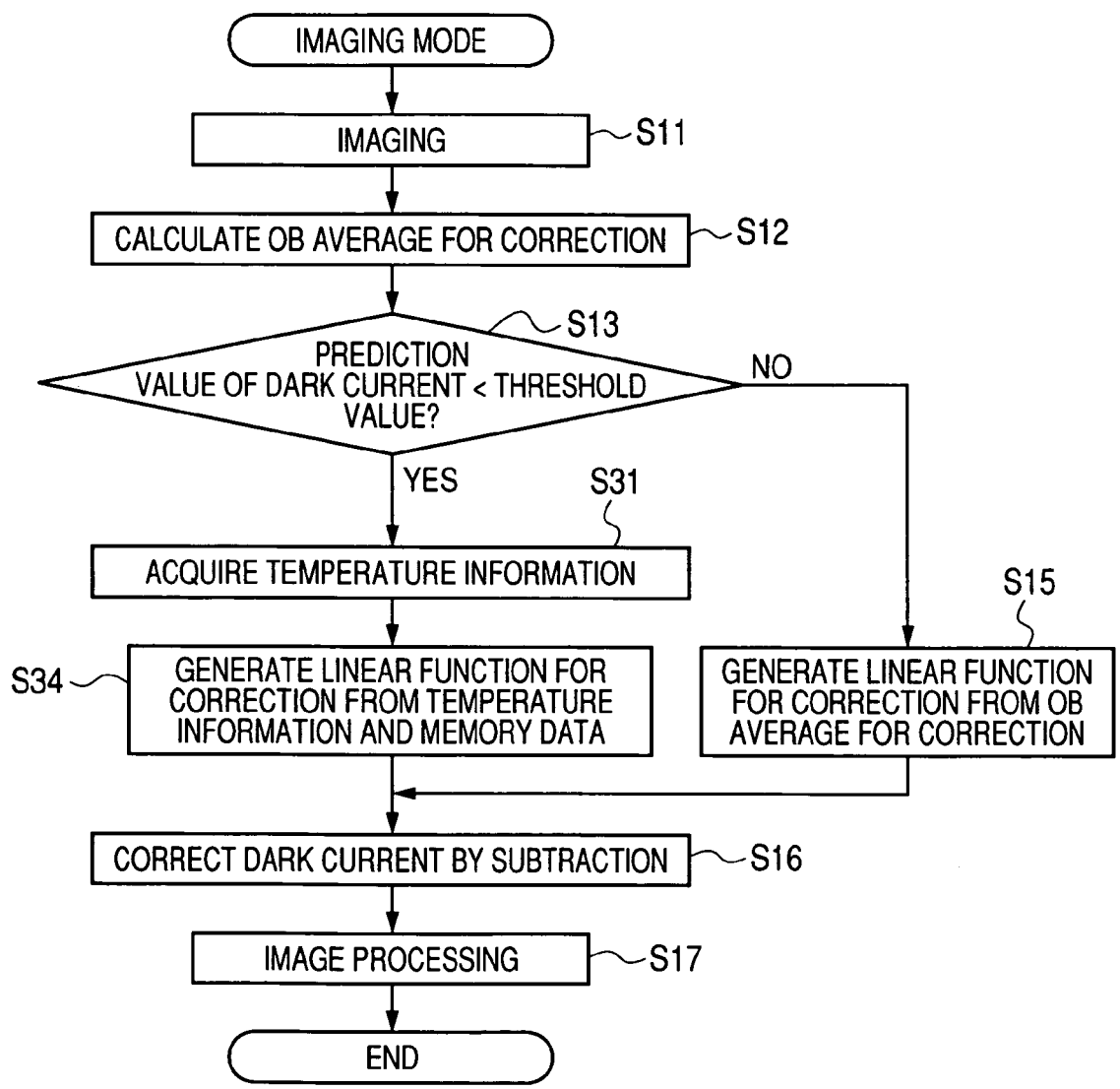
FIG. 10 is a view illustrating an operation flow in an imaging mode of the digital camera according to the second embodiment.

FIG. 10 is a view illustrating an operation flow in the imaging mode of the digital camera according to the second embodiment. In FIG. 10, the same operation flow as in FIG. 7 is denoted by the same reference numeral.

If it is determined 'YES' in step S13, the temperature information $T_{imaging}$ around the solid-state imaging device 5 at the time of the imaging in step S11 is acquired (step S31), and the linear function for correction F(y) is generated on the basis of the temperature information $T_{imaging}$ in the third mode (step S34). The other steps excluding the steps described above are the same as those shown in FIG. 7.

As described above, the same effects as described in the first embodiment can also be obtained by adopting, instead of the second mode, the third mode in which the linear function for correction F(y) is generated by processing the linear function for storage f(y) based on the temperature information $T_{imaging}$ at the time of the imaging in a state where the linear function for storage f(y) and the temperature information $T_{dark}$ are stored in the main memory 16 in association with each other.

Further, in this embodiment, the linear-function-for-correction generating portion 35 generates the linear function for correction F(y) while switching between the first mode and the third mode according to a prediction value of a dark current level. However, the linear-function-for-correction generating portion 35 does not need to execute these two modes but may execute any one of the two modes in order to achieve the object of the invention.

That is, the signal average calculating portion 31, the linear-function-for-storage generating portion 32, the temperature information acquiring portion 43, and the prediction value determining portion 37 may be eliminated, such that the linear-function-for-correction generating portion 45 generates a linear function for correction only with the first mode. Alternatively, the prediction value determining portion 37 and the OB-average-for-correction calculating portion 34 shown in FIG. 8 may be eliminated, such that the linear-function-for-correction generating portion 45 generates the linear function for correction only with the third mode.

Alternatively, in the case where the linear-function-for-correction generating portion 45 has a function of executing only the third mode, the signal average calculating portion 31 may be eliminated and the linear-function-for-storage generating portion 32 may generate a linear function for storage from signals acquired by performing the dark current acquisition drive single time. In this manner, the object of this application can be achieved even though an influence of random noises cannot be eliminated.

Furthermore, in this embodiment, functions of the signal average calculating portion 31, the linear-function-for-storage generating portion 32, and the temperature information acquiring portion 43 are executed by the digital signal processing unit 17. However, these functions may be executed by an external computer to which transmitted are signals acquired from the solid-state imaging device 5 by adjustment imaging, and the linear function for storage f(y) generated in this external computer may be stored in the main memory 16.

In addition, in the case of realizing a digital camera that executes only the third mode, a solid-state imaging device mounted in the digital camera does not need to have the configuration shown in FIG. 2. That is, a solid-state imaging device in which the OB 51 and the OB 52 shown in FIG. 2 are not provided may be used.

What is claimed is:

1. An imaging apparatus comprising:
   a solid-state imaging device in which a plurality of pixel columns, each including a plurality of pixels arrayed in a column direction on a semiconductor substrate, are arrayed in a row direction perpendicular to the column direction on the semiconductor substrate, wherein
   the solid-state imaging device comprises charge transfer sections provided corresponding to the respective pixel columns,
   each charge transfer section transfers electric charges, which are generated in the pixel column corresponding to each charge transfer section, in the column direction, and
   the plurality of pixels of each pixel column comprise
      a plurality of first pixels for acquisition of dark current level, disposed at an end portion of the corresponding charge transfer section on an upstream side in a charge transfer direction,
      a plurality of second pixels for acquisition of dark current level, disposed at an end portion of the charger transfer section on a downstream side in the charge transfer direction, and
      a plurality of light receiving pixels disposed between the first pixels and the second pixels;
   a dark current correcting unit that performs dark current correction based on a linear function for correction that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section;

an average calculating unit that calculates an average of first-pixel signals, which are acquired from the respective first pixels of each pixel column by the imaging, the average calculating unit that calculates an average of second-pixel signals, which are acquired from the respective second pixels of each pixel column by the imaging; and a linear function generating unit that sets the average of the first-pixel signals of each pixel column to a level of a dark current superimposed on a signal corresponding to an electric charge, which is generated in a light receiving pixel adjacent to the first pixels of each pixel column by the imaging, the linear function generating unit that sets the average of the second-pixels signals of each pixel column to a level of a dark current superimposed on a signal corresponding to an electric charge, which is generated in a light receiving pixel adjacent to the second pixels of each pixel column by the imaging, the linear function generating unit that generates the linear function for correction using the average of the first-pixel signals of each pixel column, the average of the second-pixel signals of each pixel column, and number of the light receiving pixels of each pixel column.

2. The imaging apparatus according to claim 1, further comprising:
an operation control unit that switches ON/OFF of an operation of the dark current correcting unit according to a photographing condition.

3. An imaging apparatus comprising:
a solid-state imaging device in which a plurality of pixel columns, each including a plurality of pixels arrayed in a column direction on a semiconductor substrate, are arrayed in a row direction perpendicular to the column direction on the semiconductor substrate, wherein
the solid-state imaging device comprises charge transfer sections provided corresponding to the respective pixel columns,
each charge transfer section transfers electric charges, which are generated in the pixel column corresponding to each charge transfer section, in the column direction, and
the plurality of pixels of each pixel column comprise
a plurality of first pixels for acquisition of dark current level, disposed at an end portion of the corresponding charge transfer section on an upstream side in a charge transfer direction,
a plurality of second pixels for acquisition of dark current level, disposed at an end portion of the charger transfer section on a downstream side in the charge transfer direction, and
a plurality of light receiving pixels disposed between the first pixels and the second pixels;
a dark current correcting unit that performs dark current correction based on a second linear function that expresses a level of a dark current using a position coordinate of each light receiving pixel as a variable, wherein
the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section;

a storage unit, wherein
dark current acquisition drive for driving the solid-state imaging device is performed in advance of the imaging and separately from the imaging,
the storage unit stores a first linear function in association with at least a first average of the first pixels, which is an average of signals corresponding to the respective first pixels among signals acquired by performing the dark current acquisition drive from the charge transfer section corresponding to each pixel column, and
each first linear function expresses a level of a dark current superimposed on a signal corresponding to the light receiving pixel, using a position coordinate of the light receiving pixel as a variable;

a second average calculating unit that calculates at least a second average of the first pixels that is an average of signals acquired from the plurality of first pixels of each pixel column by the imaging; and a second linear function generating unit that generates a second linear function by multiplying respective terms of each first linear function stored in the storage unit by a ratio of the second average to the first average corresponding to each first linear function.

4. The imaging apparatus according to claim 3, wherein
the storage unit stores the first linear function in association with a first average of the second pixels which is an average of signals corresponding to the respective second pixels among the signals acquired by performing the dark current acquisition drive from the charge transfer section corresponding to each pixel column,
the average calculating unit further calculates a second average of the second pixels that is an average of signals acquired from the plurality of second pixels of each pixel column by the imaging, and
the second linear function generating unit generates the second linear function by multiplying the respective terms of each first linear function stored in the storage unit by a ratio of a difference between the second average of the first pixels and the second average of the second pixels to a difference between the first average of the first pixels and the first average of the second pixels, which correspond to each first linear function.

5. The imaging apparatus according to claim 4, wherein each first linear function, each first average of the first pixels and each first average of the second pixels, which are stored in the storage unit, are generated using an average of the signals acquired from the corresponding charge transfer section by performing the dark current acquisition drive plural times.

6. The imaging apparatus according to claim 5, further comprising:
a driving unit that performs the dark current acquisition drive plural times in a mode for generating the first linear functions;
a signal average calculating unit that calculates an average of the signals acquired from the corresponding charge transfer section of each pixel column by performing the dark current acquisition drive the plural times;
a first linear function generating unit that generates each first linear function based on signals, which correspond to the light receiving pixels of the corresponding pixel column, among the signals subject to the calculating by the signal average calculating unit;

a first average calculating unit that calculates each first average of the first pixels that is an average of the signals, which correspond to the first pixels of the corresponding pixel column, among the signals subject to the calculating by the signal average calculating unit, the first average calculating unit that calculates each first average of the second pixels that is an average of the signals, which correspond to the second pixels of the corresponding pixel column, among the signals subject to the calculating by the signal average calculating unit; and a storage control unit that stores, in the storage unit, the first linear functions generated by the first linear function generating unit and the first averages of the first pixels and the first averages of the second pixels, which are calculated by the first average calculating unit, in association with each other.

7. The imaging apparatus according to claim 4, further comprising:

a driving unit that performs the dark current acquisition drive in a mode for generating the first linear functions;

a first linear function generating unit that generates each first linear function based on the signals, which are acquired from the corresponding charge transfer section by the dark current acquisition drive;

a first average calculating unit that calculates each first average of the first pixels which is the average of the signals corresponding to the respective first pixels among the signals acquired by performing the dark current acquisition drive from the corresponding charge transfer section, the first average calculating unit that calculates each first average of the second pixels which is an average of signals corresponding to the respective second pixels among the signals acquired by performing the dark current acquisition drive from the corresponding charge transfer section; and a storage control unit that stores, in the storage unit, the first linear functions generated by the first linear function generating unit and the first averages of the first pixels and the first averages of the second pixels, which are calculated by the first average calculating unit, in association with each other.

8. The imaging apparatus according to claim 3, wherein each first linear function and each first average of the first pixels, which are stored in the storage unit, are generated using an average of signals acquired from the corresponding charge transfer section by performing the dark current acquisition drive plural times.

9. The imaging apparatus according to claim 8, further comprising:

a driving unit that performs the dark current acquisition drive plural times in a mode for generating the first linear functions;

a signal average calculating unit that calculates the average of the signals acquired from the corresponding charge transfer section of each pixel column by performing the dark current acquisition drive the plural times;

a first linear function generating unit that generates each first linear function based on signals, which correspond to the light receiving pixels of the corresponding pixel column, among the signals subject to the calculating by the signal average calculating unit;

a first average calculating unit that calculates each first average of the first pixels that is the average of the signals, which correspond to the first pixels of the corresponding pixel column, among the signals subject to the calculating by the signal average calculating unit; and a storage control unit that stores, in the storage unit, the first linear functions generated by the first linear function generating unit and the first averages of the first pixels calculated by the first average calculating unit in association with each other.

10. The imaging apparatus according to claim 3, further comprising:

a driving unit that performs the dark current acquisition drive in a mode for generating the first linear functions;

a first linear function generating unit that generates each first linear function based on the signals, which are acquired from the corresponding charge transfer section by the dark current acquisition drive;

a first average calculating unit that calculates each first average of the first pixels which is the average of the signals corresponding to the respective first pixels among the signals acquired by performing the dark current acquisition drive from the corresponding charge transfer section; and a storage control unit that stores, in the storage unit, the first linear functions generated by the first linear function generating unit and the first averages of the first pixels calculated by the first average calculating unit in association with each other.

11. An imaging apparatus comprising:

a solid-state imaging device in which at least one pixel column including a plurality of pixels arrayed in a column direction on a semiconductor substrate, is arrayed in a row direction perpendicular to the column direction on the semiconductor substrate, wherein the solid-state imaging device comprises a charge transfer section provided corresponding to the pixel column, and the charge transfer section transfers electric charges, which are generated in the pixel column corresponding to the charge transfer section, in the column direction;

a dark current correcting unit that performs dark current correction based on a second linear function that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the charge transfer section;

a temperature detecting unit that detects a temperature around the solid-state imaging device;

a storage unit, wherein dark current acquisition drive for driving the solid-state imaging device is performed in advance of the imaging and separately from the imaging, the storage unit stores a first linear function in association with temperature information around the solid-state imaging device which is detected by the temperature detecting unit during the dark current acquisition drive, and the first linear function expresses a level of a dark current superimposed on a signal corresponding to each light receiving pixel, using a position coordinate of each light receiving pixel as a variable; and a second linear function generating unit that generates the second linear function by multiplying respective terms of the first linear function stored in the storage unit by a ratio of temperature information detected by the temperature detecting unit during the imaging to the temperature information corresponding to the first linear function.

12. The imaging apparatus according to claim 11, wherein the first linear function stored in the storage unit is generated using an average of signals acquired from the corresponding charge transfer section by performing the dark current acquisition drive plural times under a condition where the temperature around the solid-state imaging device is equal.

13. The imaging apparatus according to claim 12, further comprising:
a driving unit that performs the dark current acquisition drive plural times in a mode for generating the first linear function;
a signal average calculating unit that calculates an average of signals acquired from the corresponding charge transfer section by performing the dark current acquisition drive the plural times;
a first linear function generating unit that generates the first linear function based on signals, which correspond to the light receiving pixels of the pixel column, among the signals subject to the calculating by the signal average calculating unit; and
a storage control unit that stores, in the storage unit, temperature information detected by the temperature detecting unit during the dark current acquisition drive and the first linear function generated by the first linear function generating unit in association with each other.

14. The imaging apparatus according to claim 11, further comprising:
a driving unit that performs the dark current acquisition drive in a mode for generating the first linear function;
a first linear function generating unit that generates the first linear function based on the signals, which are acquired from the corresponding charge transfer section by the dark current acquisition drive; and
a storage control unit that stores, in the storage unit, temperature information detected by the temperature detecting unit during the dark current acquisition drive and the first linear function generated by the first linear function generating unit in association with each other.

15. An imaging apparatus capable of switching between (i) a first mode in which functions of the respective units of the imaging apparatus according to claim 1 are executed and (ii) a second mode in which functions of the respective units of the imaging apparatus according to claim 3 are executed, wherein
the first mode is executed when a prediction value of the level of the dark current superimposed on the electric charge generated in each light receiving pixel of the pixel column by the imaging is larger than a threshold value, and
the second mode is executed when the prediction value is smaller than the threshold value.

16. The imaging apparatus according to claim 15, further comprising:
a prediction value determining unit that determines the prediction value based on at least an average of first-pixel signals which are acquired from the first pixels of the pixel column by the imaging among the average of the first-pixel signals and an average of second-pixel signals, which are acquired from the second pixels of the pixel column by the imaging.

17. The imaging apparatus according to claim 15, further comprising:
a prediction value determining unit that determines the prediction value based on temperature around the solid-state imaging device during the imaging.

18. A signal processing method for processing signals acquired from a solid-state imaging device in which a plurality of pixel columns, each including a plurality of pixels arrayed in a column direction on a semiconductor substrate, are arrayed in a row direction perpendicular to the column direction on the semiconductor substrate, wherein
the solid-state imaging device comprises charge transfer sections provided corresponding to the respective pixel columns,
each charge transfer section transfers electric charges, which are generated in the pixel column corresponding to each charge transfer section, in the column direction, and
the plurality of pixels of each pixel column comprise
a plurality of first pixels for acquisition of dark current level, disposed at an end portion of the corresponding charge transfer section on an upstream side in a charge transfer direction,
a plurality of second pixels for acquisition of dark current level, disposed at an end portion of the charger transfer section on a downstream side in the charge transfer direction, and
a plurality of light receiving pixels disposed between the first pixels and the second pixels,
the method comprising:
performing dark current correction based on a linear function for correction that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section;
calculating an average of first-pixel signals, which are acquired from the respective first pixels of each pixel column by the imaging;
calculating an average of second-pixel signals, which are acquired from the respective second pixels of each pixel column by the imaging;
setting the average of the first-pixel signals of each pixel column to a level of a dark current superimposed on a signal corresponding to an electric charge, which is generated in a light receiving pixel adjacent to the first pixels of each pixel column by the imaging;
setting the average of the second-pixels signals of each pixel column to a level of a dark current superimposed on a signal corresponding to an electric charge, which is generated in a light receiving pixel adjacent to the second pixels of each pixel column by the imaging; and
generating the linear function for correction using the average of the first-pixel signals of each pixel column, the average of the second-pixel signals of each pixel column, and number of the light receiving pixels of each pixel column.

19. The method according to claim 18, further comprising:
switching between the performing of the dark current correction and non-performing of the dark current correction, according to a photographing condition.

20. A signal processing method for processing signals acquired from a solid-state imaging device in which a plurality of pixel columns, each including a plurality of pixels arrayed in a column direction on a semiconductor substrate, are arrayed in a row direction perpendicular to the column direction on the semiconductor substrate, wherein the solid-state imaging device comprises charge transfer sections provided corresponding to the respective pixel columns, each charge transfer section transfers electric charges, which are generated in the pixel column corresponding to each charge transfer section, in the column direction, and the plurality of pixels of each pixel column comprise
a plurality of first pixels for acquisition of dark current level, disposed at an end portion of the corresponding charge transfer section on an upstream side in a charge transfer direction,
a plurality of second pixels for acquisition of dark current level, disposed at an end portion of the charger transfer section on a downstream side in the charge transfer direction, and
a plurality of light receiving pixels disposed between the first pixels and the second pixels, the method comprising:

performing dark current correction based on a second linear function that expresses a level of a dark current using a position coordinate of each light receiving pixel as a variable, wherein:
the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the corresponding charge transfer section, and
dark current acquisition drive for driving the solid-state imaging device is performed in advance of the imaging and separately from the imaging;

storing, in a storage unit, a first linear function in association with at least a first average of the first pixels, which is an average of signals corresponding to the respective first pixels among signals acquired by performing the dark current acquisition drive from the charge transfer section corresponding to each pixel column, wherein each first linear function expresses a level of a dark current superimposed on a signal corresponding to the light receiving pixel, using a position coordinate of the light receiving pixel as a variable;

calculating at least a second average of the first pixels that is an average of signals acquired from the plurality of first pixels of each pixel column by the imaging; and generating a second linear function by multiplying respective terms of each stored first linear function by a ratio of the second average to the first average corresponding to each first linear function.

21. The method according to claim 20, wherein
the storing stores, in the storage unit, the first linear function in association with a first average of the second pixels which is an average of signals corresponding to the respective second pixels among the signals acquired by performing the dark current acquisition drive from the charge transfer section corresponding to each pixel column, the method further comprising:
calculating a second average of the second pixels that is an average of signals acquired from the plurality of second pixels of each pixel column by the imaging, wherein:
the generating generates the second linear function by multiplying the respective terms of each first linear function stored in the storage unit by a ratio of a difference between the second average of the first pixels and the second average of the second pixels to a difference between the first average of the first pixels and the first average of the second pixels, which correspond to each first linear function.

22. The method according to claim 21, wherein each first linear function, each first average of the first pixels and each first average of the second pixels, which are stored in the storage unit, are generated using an average of the signals acquired from the corresponding charge transfer section by performing the dark current acquisition drive plural times.

23. The method according to claim 22, wherein the performing of the dark current acquisition drive performs the dark current acquisition drive plural times in a mode for generating the first linear functions, the method further comprising:
calculating an average of the signals acquired from the corresponding charge transfer section of each pixel column by performing the dark current acquisition drive the plural times;
generating each first linear function based on signals, which correspond to the light receiving pixels of the corresponding pixel column, among the signals subject to the calculating of the average of the signals;
calculating each first average of the first pixels that is an average of the signals, which correspond to the first pixels of the corresponding pixel column, among the signals subject to the calculating of the average of the signals; and
calculating each first average of the second pixels that is an average of the signals, which correspond to the second pixels of the corresponding pixel column, among the signals subject to the calculating of the average of the signal, wherein:
the storing stores, in the storage unit, the generated first linear functions, the calculated first averages of the first pixels and the calculated first averages of the second pixels in association with each other.

24. The method according to claim 21, wherein the performing of the dark current acquisition drive performs the dark current acquisition drive in a mode for generating the first linear functions, the method further comprising:
generating each first linear function based on the signals, which are acquired from the corresponding charge transfer section by the dark current acquisition drive;
calculating each first average of the first pixels which is the average of the signals corresponding to the respective first pixels among the signals acquired by performing the dark current acquisition drive from the corresponding charge transfer section; and
calculating each first average of the second pixels which is an average of signals corresponding to the respective second pixels among the signals acquired by performing the dark current acquisition drive from the corresponding charge transfer section, wherein:
the storing stores, in the storage unit, the generated first linear functions, the calculated first averages of the first pixels and the calculated first averages of the second pixels in association with each other.

25. The method according to claim 20, wherein each first linear function and each first average of the first pixels, which are stored in the storage unit, are generated using an average of signals acquired from the corresponding charge transfer section by performing the dark current acquisition drive plural times.

26. The method according to claim 25, wherein:
the performing of the dark current acquisition drive performs the dark current acquisition drive plural times in a mode for generating the first linear functions;
the method further comprising:
calculating the average of the signals acquired from the corresponding charge transfer section of each pixel column by performing the dark current acquisition drive the plural times;
generating each first linear function based on signals, which correspond to the light receiving pixels of the corresponding pixel column, among the signals subject to the calculating of the average of the signals; and
calculating each first average of the first pixels that is the average of the signals, which correspond to the first pixels of the corresponding pixel column, among the signals subject to the calculating of the average of the signals, wherein:
the storing stores, in the storage unit, the generated first linear functions and the calculated first averages of the first pixels in association with each other.

27. The method according to claim 20, wherein the performing of the dark current acquisition drive performs the dark current acquisition drive in a mode for generating the first linear functions;
the method further comprising:
generating each first linear function based on the signals, which are acquired from the corresponding charge transfer section by the dark current acquisition drive; and
calculating each first average of the first pixels which is the average of the signals corresponding to the respective first pixels among the signals acquired by performing the dark current acquisition drive from the corresponding charge transfer section, wherein:
the storing stores, in the storage unit, the generated first linear functions and the calculated first averages of the first pixels calculated in association with each other.

28. A signal processing method for processing signals acquired from a solid-state imaging device in which at least one pixel column including a plurality of pixels arrayed in a column direction on a semiconductor substrate, is arrayed in a row direction perpendicular to the column direction on the semiconductor substrate, wherein
the solid-state imaging device comprises a charge transfer section provided corresponding to the pixel column, and
the charge transfer section transfers electric charges, which are generated in the pixel column corresponding to the charge transfer section, in the column direction,
the method comprising:
performing dark current correction based on a second linear function that expresses a level of a dark current using a position coordinate of each light receiving pixel as a variable, wherein the dark current correction subtracts the dark current from a signal corresponding to an electric charge which is generated in each light receiving pixel by imaging, the dark current being a signal corresponding to a dark charge superimposed on the electric charge generated in each light receiving pixel when the electric charge is transferred through the charge transfer section;
detecting a temperature around the solid-state imaging device, wherein:
dark current acquisition drive for driving the solid-state imaging device is performed in advance of the imaging and separately from the imaging,
a first linear function is stored in a storage unit in association with temperature information around the solid-state imaging device, which is detected during the dark current acquisition drive, and
the first linear function expresses a level of a dark current superimposed on a signal corresponding to each light receiving pixel, using a position coordinate of each light receiving pixel as a variable; and
generating the second linear function by multiplying respective terms of the first linear function stored in the storage unit by a ratio of temperature information, which is detected during the imaging, to the temperature information corresponding to the first linear function.

29. The method according to claim 28, wherein the first linear function stored in the storage unit is generated using an average of signals acquired from the corresponding charge transfer section by performing the dark current acquisition drive plural times under a condition where the temperature around the solid-state imaging device is equal.

30. The method according to claim 29, wherein the performing of the dark current acquisition drive performs the dark current acquisition drive plural times in a mode for generating the first linear function,
the method further comprising:
calculating an average of signals acquired from the corresponding charge transfer section by performing the dark current acquisition drive the plural times;
generating the first linear function based on signals, which correspond to the light receiving pixels of the pixel column, among the signals subject to the calculating of the average of the signals; and
storing, in the storage unit, temperature information which is detected during the dark current acquisition drive and the generated first linear function in association with each other.

31. The method according to claim 28, wherein the performing of the dark current acquisition drive performs the dark current acquisition drive in a mode for generating the first linear function,
the method further comprising:
generating the first linear function based on the signals, which are acquired from the corresponding charge transfer section by performing the dark current acquisition drive; and
storing, in the storage unit, temperature information which is detected during the dark current acquisition drive and the generated first linear function in association with each other.

32. A signal processing method capable of switching between (i) a first mode in which the respective steps of the method according to claim 18 are executed and (ii) a second mode in which the respective steps of the method according to claim 19 are executed,
the method comprising:
executing the first mode when a prediction value of the level of the dark current superimposed on the electric charge generated in each light receiving pixel of the pixel column by the imaging is larger than a threshold value; and executing the second mode when the prediction value is smaller than the threshold value.

33. The method according to claim 32, further comprising:
determining the prediction value based on at least an average of first-pixel signals which are acquired from the first pixels of the pixel column by the imaging among the average of the first-pixel signals and an average of second-pixel signals, which are acquired from the second pixels of the pixel column by the imaging.

34. The method according to claim 32, further comprising:
determining the prediction value based on temperature around the solid-state imaging device during the imaging.

* * * * *